US009689640B2

(12) United States Patent
Houle

(10) Patent No.: US 9,689,640 B2
(45) Date of Patent: Jun. 27, 2017

(54) VIBRATION ABSORBER

(71) Applicant: PLACEMENTS GASTON HOULE INC., Wickham (CA)

(72) Inventor: Gaston Houle, Wickham (CA)

(73) Assignee: PLACEMENTS GASTON HOULE INC., Montreal (CA)

( * ) Notice: Subject to any disclaimer, the term of this patent is extended or adjusted under 35 U.S.C. 154(b) by 0 days.

(21) Appl. No.: 15/134,530

(22) Filed: Apr. 21, 2016

(65) Prior Publication Data

US 2016/0313085 A1    Oct. 27, 2016

Related U.S. Application Data

(60) Provisional application No. 62/151,062, filed on Apr. 22, 2015.

(51) Int. Cl.
| | | |
|---|---|---|
| *F41B 5/20* | (2006.01) | |
| *F41B 5/14* | (2006.01) | |
| *F16F 1/36* | (2006.01) | |

(52) U.S. Cl.
CPC ............ *F41B 5/1426* (2013.01); *F16F 1/36* (2013.01)

(58) Field of Classification Search
CPC ................................ F41B 5/1426; F16F 1/36
See application file for complete search history.

(56) References Cited

U.S. PATENT DOCUMENTS

| | | | |
|---|---|---|---|
| 4,061,125 A | 12/1977 | Trotter | |
| 4,573,842 A * | 3/1986 | Mantela | B60P 3/079 24/265 H |
| 4,628,892 A | 12/1986 | Windedahl | |
| D315,936 S * | 4/1991 | Wilson | 482/129 |
| 5,362,046 A | 11/1994 | Sims | |
| 5,452,704 A | 9/1995 | Winebarger | |
| 5,595,168 A | 1/1997 | Martin | |
| 5,704,341 A * | 1/1998 | Ritzenthaler | F41J 9/20 124/17 |
| 5,720,269 A | 2/1998 | Saunders | |
| 6,298,842 B1 | 10/2001 | Sims | |
| D454,382 S | 3/2002 | Sims | |
| 6,634,348 B2 | 10/2003 | Gallops, Jr. | |
| 6,684,874 B2 | 2/2004 | Mizek | |
| 6,910,472 B2 | 6/2005 | Mizek | |

(Continued)

FOREIGN PATENT DOCUMENTS

WO      WO0040916      7/2000

OTHER PUBLICATIONS

Sims String Decelerator by Archery FS Discount Archery Product, published on the website of FS Discount Archery Product (Tustin, CA, USA) published on Feb. 11, 2015. http://www.fsdiscountarchery.com/simsstringdeceleratornew.aspx.

*Primary Examiner* — John Ricci
(74) *Attorney, Agent, or Firm* — Mathieu Audet

(57) ABSTRACT

A vibration absorber with an elongated body about a longitudinal axis thereof is presented, the elongated body including two longitudinal ends thereof, an elongated opening in the elongated body and a pair of protruding portions axially extending in cantilever from respective ends of the elongated body, the pair of protruding portions absorbing vibrations when the vibration absorber is secured to a vibrating object. A string-equipped apparatus for propelling a projectile with a vibration absorber and a method of installation thereof is equally presented.

18 Claims, 29 Drawing Sheets

(56) References Cited

U.S. PATENT DOCUMENTS

| | | |
|---|---|---|
| 6,966,314 B2 | 11/2005 | McPherson |
| 7,703,449 B2 | 4/2010 | Wright |
| D648,410 S | 11/2011 | Sims |
| D679,357 S | 4/2013 | Wright |
| 8,567,381 B2 | 10/2013 | Saunders |
| D692,976 S | 11/2013 | Sims |
| 8,839,775 B2 | 9/2014 | Wasilewski |
| 8,939,139 B2 | 1/2015 | Sims |
| 2002/0088448 A1 | 7/2002 | Sims |
| 2003/0094168 A1 | 5/2003 | Sims |
| 2003/0121510 A1 | 7/2003 | Mizek |
| 2004/0154601 A1 | 8/2004 | Mizek |
| 2009/0032005 A1 | 2/2009 | Wright |
| 2009/0133683 A1 | 5/2009 | Wright |
| 2010/0319670 A1 | 12/2010 | Sims |
| 2011/0214656 A1 | 9/2011 | Saunders |
| 2013/0174825 A1 | 7/2013 | Bednar |
| 2014/0041645 A1 | 2/2014 | Wasilewski |

\* cited by examiner

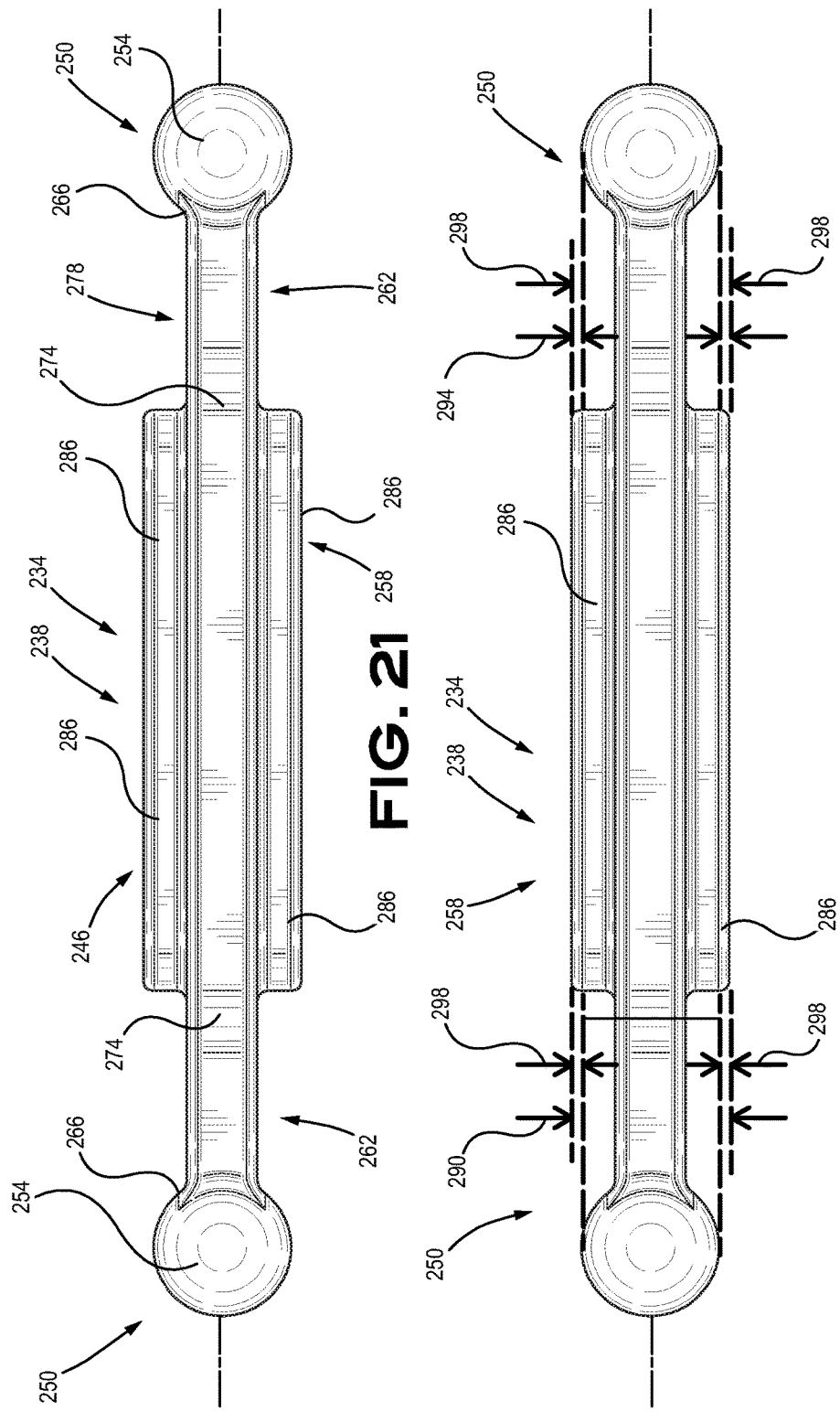

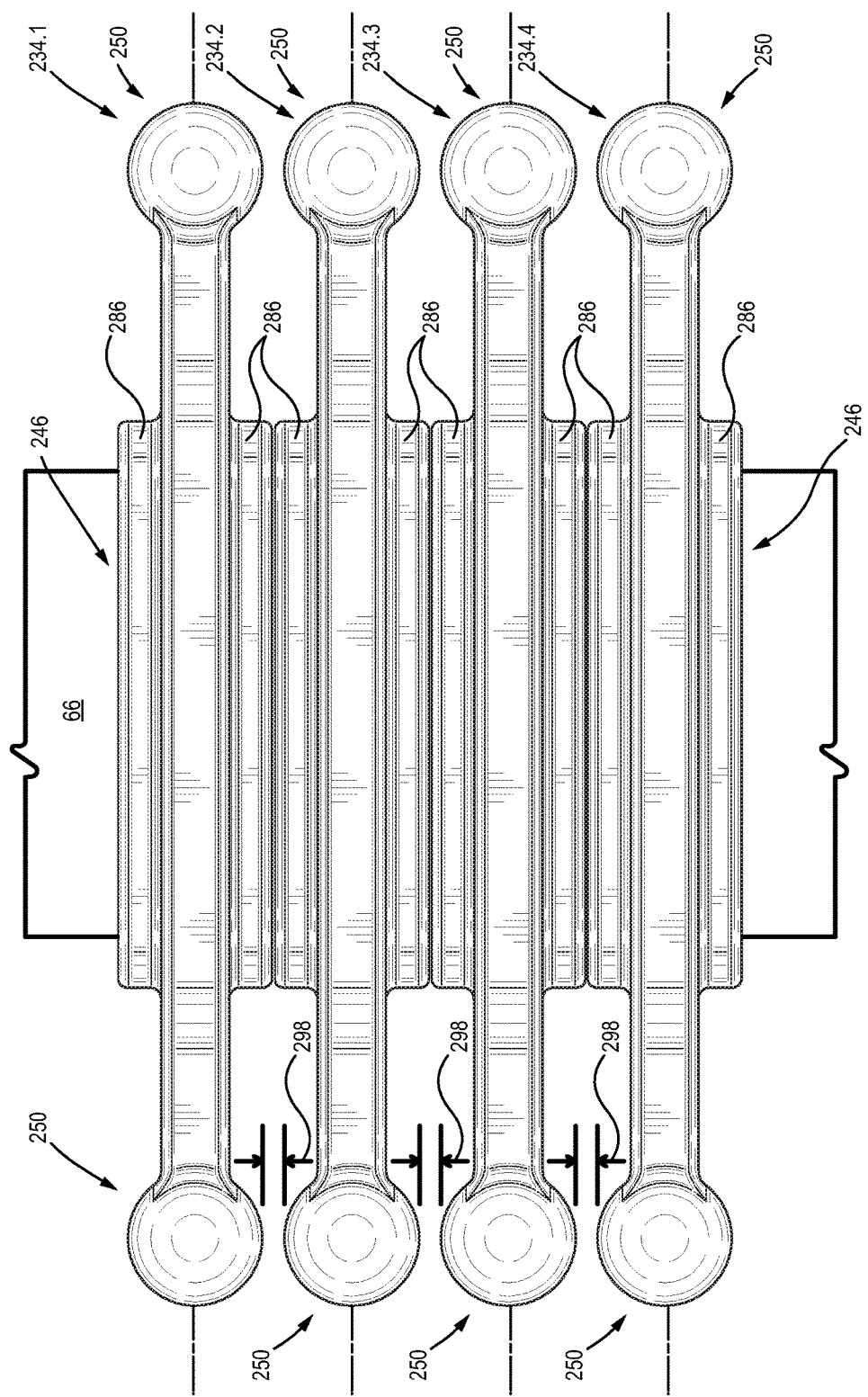

VIBRATION ABSORBER

CROSS-REFERENCES

The present application is a non-provisional application of, and claims priority under 35 U.S.C. 119(e) to, U.S. provisional patent application No. 62/151,062 filed Apr. 22, 2015, entitled VIBRATION ABSORBER, filed under 35 U.S.C. 111(b), which is incorporated herein by reference in its entirety.

BACKGROUND OF THE INVENTION

1. Field of the Invention

This invention generally relates to a string apparatus generally referred to as crossbows and bows. The present invention more specifically relates to a vibration damper/absorber adapted to be used to reduce/absorb vibrations of a portion of a bow or a crossbow. The present invention also more specifically relates to noise reduction when an arrow is propelled by the bow and crossbow.

2. Description of the Related Art

Bows and crossbows are known since a long time as, originally, a war tool and, later, an alternative to guns for hunting and recreation shooting. Crossbows, for example, are designed, just like bows, to pretense the string thereof and install an arrow in a position ready to shoot. The crossbow configuration locates a stirrup at a longitudinal distal end thereof, where the arrow is propelled by the string. The crossbow is generally heading down resting on its stirrup in contact with the ground to receive a foot therein to firmly maintain the crossbow to the ground in opposition to the tension required to proximally pull, generally by hand power or by a manual mechanism, the string and lock the string in a position adapted to longitudinally propel the arrow when the tension in the string is released.

Significant vibrations are produced when the arrow is propelled. At shooting, the quick release of tension in the tensed limbs propelling the arrow and the abrupt stopping of the string generate significant vibrations that are causing audible noise. That noise is not desirable in the context of hunting because it is repelling the hunted animals and is warning of the geographical location of the shooting. Further, the vibrations can also jeopardize the precision of the shoot by effecting the stability of the string-equipped apparatus.

It is therefore desirable to provide a mechanism over the existing art that reduces and/or absorb vibrations to reduce the operating noise of a bow or a crossbow.

It is therefore desirable to provide mechanism over the existing art that protects limbs and frames of bows and crossbows against vibrations to reduce the stress caused by vibrations.

It is also desirable to provide a vibration reducing/absorbing mechanism that can be added to an existing bows and crossbows.

It is also desirable to provide a vibration reducing/absorbing mechanism that can be discretely located to an existing bows and crossbows.

Other deficiencies will become apparent to one skilled in the art to which the invention pertains in view of the following summary and detailed description with its appended figures.

SUMMARY OF THE INVENTION

One aspect of the present invention is to alleviate one or more of the shortcomings of the background art by addressing one or more of the existing needs in the art.

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The invention is generally relates to a vibration damper generally made of rubberized material and embodied in a relatively longitudinal shape, the longitudinal shape is provided, at least at one end thereof, with a protruding portion, in cantilever with a bow-equipped device, the longitudinal shape includes an opening thereof sized and designed to insert therein a vibrating portion of the bow-equipped device to receive vibration thereof, the rubberized material stretching for securing the vibration damper to the bow-equipped device and is generally held in place by the elastic and sticky behavior of the material on the bow-equipped device to reduce operating vibrations of a bow-equipped device.

The invention is generally described as a device adapted to reduce operating vibrations of a bow.

The invention is also generally described as a device adapted to reduce operating vibrations of a crossbow.

The invention is generally described as a device adapted to absorb operating vibrations of a bow.

The invention is also generally described as a device adapted to absorb operating vibrations of a crossbow.

Aspects of our work provide, in accordance with at least one embodiment, a vibration damper/absorber for use in conjunction with a bow and crossbow. For ease of reading, the term damper is going to be used throughout the present specification without disclaiming the function of absorbing vibrations, which is somehow related to damping vibrations.

Aspects of our work provide, in accordance with at least one embodiment, a vibration damper adapted to be installed on vibrating parts of a bow or a crossbow.

Aspects of our work provide, in accordance with at least one embodiment, a vibration damper including an opening therein adapted to secure a portion of a bow or a crossbow.

Aspects of our work provide, in accordance with at least one embodiment, a vibration damper adapted to be installed on limbs of a bow or a crossbow.

Aspects of our work provide, in accordance with at least one embodiment, a plurality of vibration dampers adapted to be collectively installed on vibrating parts of a bow or a crossbow.

Aspects of our work provide, in accordance with at least one embodiment, groupings of vibration dampers acting collectively to reduce vibration of the bow or the crossbow.

Aspects of our work provide vibration dampers of different sizes acting collectively to reduce vibration of the bow or the crossbow.

Aspects of our work provide vibration dampers disposed on a plurality of locations on the bow and crossbow to reduce vibration of the bow or the crossbow.

Aspects of our work provide a method of using vibration dampers disposed on a plurality of locations on the bow or crossbow to reduce vibration of the bow or the crossbow.

Aspects of our work provide, in accordance with at least one embodiment, a vibration damper including a cantilever portion thereof.

Aspects of our work provide, in accordance with at least one embodiment, a vibration damper including two opposed cantilever portions thereof.

Aspects of our work provide, in accordance with at least one embodiment, a vibration damper including a slot therein adapted to receive therein a vibrating portion of the bow and crossbow.

Aspects of our work provide, in accordance with at least one embodiment, a vibration damper including a protrusion adapted to distance two adjacent vibration dampers in order to prevent contact between cantilever portions of respective vibration dampers.

Aspects of our work provide, in accordance with at least one embodiment, a vibration damper including rubber.

Aspects of our work provide, in accordance with at least one embodiment, a vibration damper including a geometrical mass disposed in cantilever.

Aspects of our work provide, in accordance with at least one embodiment, a vibration damper including a mass disposed in cantilever.

Aspects of our work provide, in accordance with at least one embodiment, a vibration damper including symmetrical and opposed masses disposed in cantilever.

Aspects of our work provide, in accordance with at least one embodiment, a vibration damper including a material adapted to prevent slippering of the vibration damper installed on a vibrating portion of the bow and crossbow to keep the vibration damper in a desired position.

Aspects of our work provide, in accordance with at least one embodiment, a method of installing a vibration damper including a material suitable to prevent slippering of the vibration damper installed on a vibrating portion of the bow or the crossbow to keep the vibration damper in a desired position.

Aspects of our work provide, in accordance with at least one embodiment, a vibration damper including a securing slot therein sized and designed to prevent slippering of the vibration damper installed on a vibrating portion of the bow or the crossbow to keep the vibration damper in a desired position.

Aspects of our work provide, in accordance with at least one embodiment, a vibration damper adapted to be assembled over a limb of a bow or the crossbow without having to disassemble the string from the bow and crossbow.

Aspects of our work provide, in accordance with at least one embodiment, a plurality of vibration dampers adapted to be collectively secured together to circle and attach to a portion of a bow or the crossbow.

Aspects of our work provide, in accordance with at least one embodiment, a plurality of vibration dampers adapted to be collectively secured together to circle and attach to a portion of a bow and crossbow, the cantilever mass interlocking adjacent vibration dampers.

Aspects of our work provide, in accordance with at least one embodiment, a clipping vibration damper including an opening therein adapted to be opened and closed with a closing mechanism thereof to allow installation of the clipping vibration over a limb of a bow and crossbow without requiring to remove the string from the limb to install a vibration damper.

Each of the embodiments of the present invention has at least one of the above-mentioned objects and/or aspects, but does not necessarily have all of them. It should be understood that some aspects of the present invention that have resulted from attempting to attain the above-mentioned objects may not satisfy these objects and/or may satisfy other objects not specifically recited herein.

Additional and/or alternative features, aspects, and advantages of embodiments of the present invention will become apparent from the following description, the accompanying drawings, and the appended claims.

BRIEF DESCRIPTION OF THE DRAWINGS

FIG. 20 is a side elevational view of an exemplary vibration damper in accordance with at least one embodiment of the present invention;

FIG. 21 is a side elevational view of an exemplary vibration damper in accordance with at least one embodiment of the present invention;

FIG. 22 is a side view of a plurality of vibration dampers assembled in an exemplary arrangement in accordance with at least one embodiment of the present invention;

DESCRIPTION OF EMBODIMENT(S) OF THE INVENTION

Our work is now described with reference to the Figures. In the following description, for purposes of explanations, numerous specific details are set forth in order to provide a thorough understanding of the present invention by way of embodiment(s). It may be evident, however, that the present invention may be practiced without these specific details.

Figure 1:
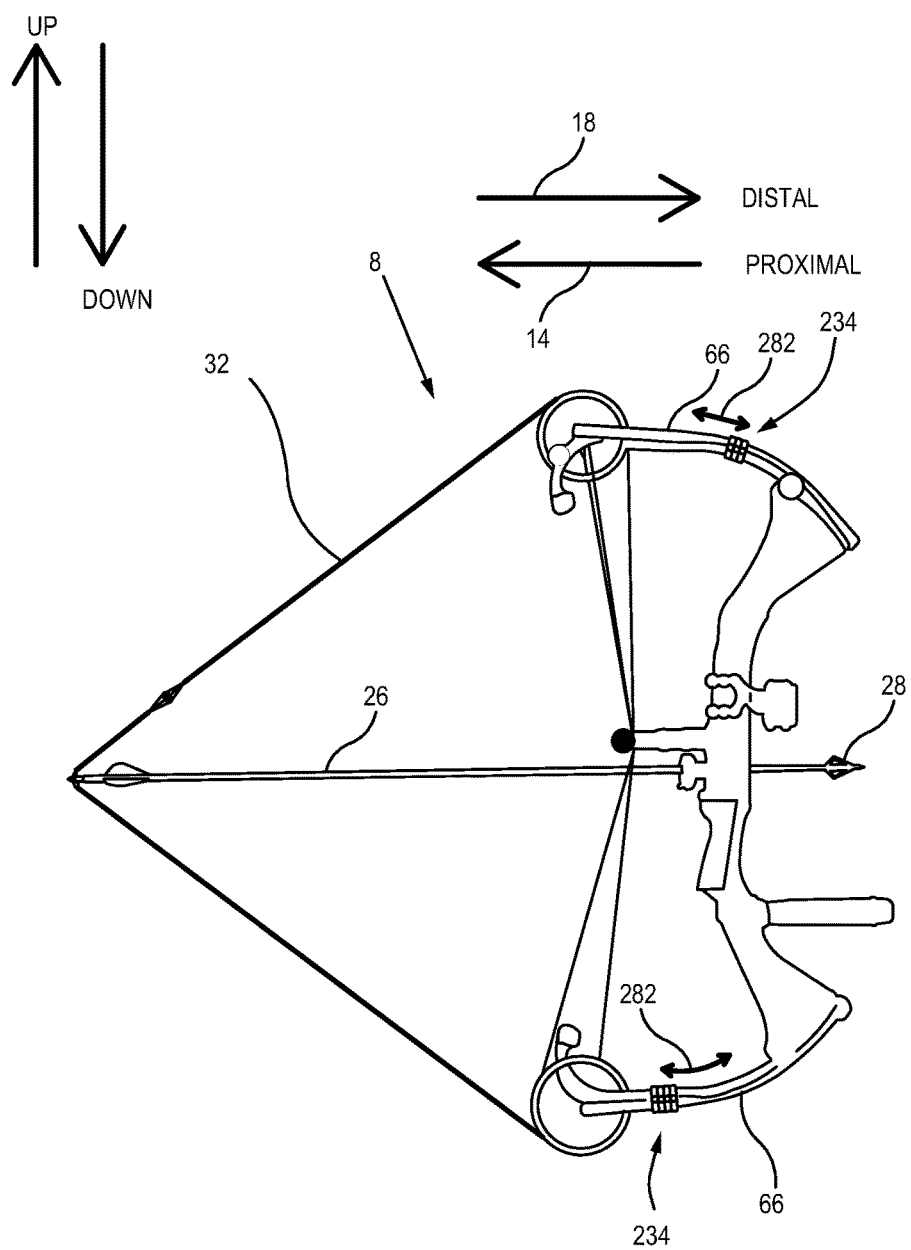
FIG. 1 is a right elevation view of an exemplary bow with vibration dampers secured thereon in accordance with at least one embodiment of the present invention.

A typical hunting bow 8 is illustrated in FIG. 1, the bow 8 includes a pair of limbs 66 interconnected and adapted to be tensed by a string 32. The pair of limbs 66 is sized and designed to be flexed to accumulate energy that is selectively released to propel an arrow 26. Upon propulsion of the arrow 26, the limbs 66 are unflexing and are transmitting the energy stored therein to the arrow 26 by propulsing the arrow 26. The rapid acceleration and stopping of the string 32 and the limbs 66 create significant vibrations. These vibrations are generally translating into audible noises that are unfavorable to successful hunting. These vibrations are detrimental to hunting in addition to strongly mechanically solicitate portions of the apparatus like the string 32 and the limbs 66. A plurality of vibration dampers 234, in accordance with an embodiment of the invention and for providing a tangible example thereof, are affixed to the limbs 66 of the bow 8 in order to damp the vibrations of the string 32 and the limbs 66. The vibration dampers 234 are exemplified in a group of three vibration dampers 234 and a group of four vibration dampers 234. A single vibration damper 234 or a plurality of vibration dampers 234 can collectively be used. The positions 282, the number and the grouping of the vibration dampers 234 on the bow 8 are for illustrative purposes. Indeed, the positions 282, the number and the grouping of the vibration dampers 234 can be adjusted according to optimizing the damping of the device.

Figure 2:
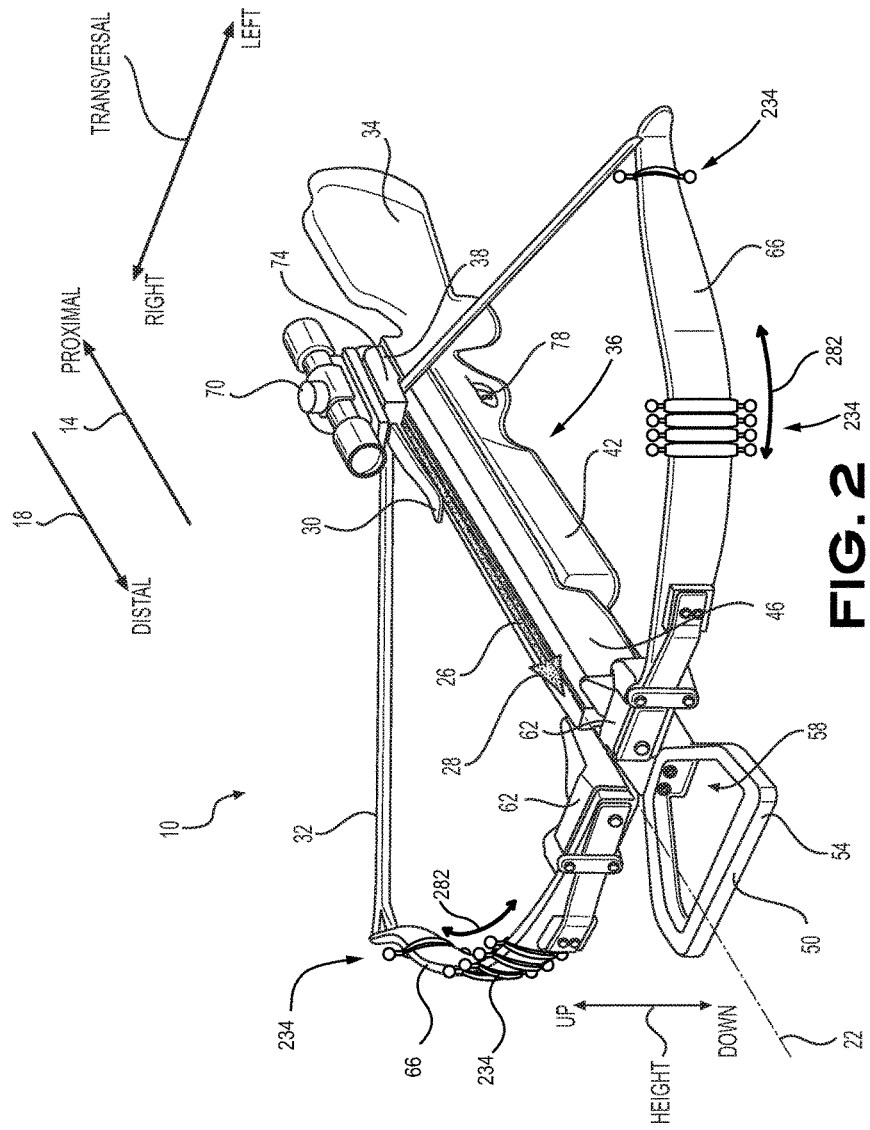
FIG. 2 is an isometric view of an exemplary crossbow with vibration dampers secured thereon in accordance with at least one embodiment of the present invention.

Similarly, a crossbow 10 is illustrated in FIG. 2, the crossbow 10 includes a side proximal 14 to the user and a side distal 18 to the user 90 when the crossbow 10 is held by a user in a shooting position. The crossbow 10 includes a longitudinal axis 22 along which an arrow 26, when properly installed on the crossbow 10 in its flight groove and optionally held by a arrow retention spring 30, is properly located to be propelled by a string 32. The crossbow 10 further comprises a body 36 including a stock 34, a sight bridge 38, a foregrip 42 and a barrel 46. On its distal 18 end, the crossbow 10 has a stirrup 50 disposed thereon. The stirrup 50 includes a frame 54 and a foot-receiving portion 58 associated therewith. The stirrup 50 is configured to help the user 90 of the crossbow to cock the string 32. Generally, the distal 18 end of the crossbow 10 is put in contact on the ground 102, the user 90 puts a foot on the stirrup 50 and holds the stirrup 50 against the ground 102 with a foot pressure opposing the tensing string 32. As illustrated, the stirrup 50 is fastened to the body 36 at a distal end 18 of the barrel 46 next to the riser 62 to which are connected a pair of limbs 66 on respective transversal side thereof. The pair of limbs 66 is adapted to be flexed to accumulate energy that is selectively released to propel the arrow 26. The crossbow 10 is further equipped with an optional sight 70 and a latch 74 holds the tensed string 32 that can be selectively released to discharge the string 32 and propel the arrow 26 upon actuation of the trigger 78 by the user 90. A plurality of vibration dampers 234 is affixed to the limbs 66 in order to damp the vibrations of the string 32 and the limbs 66. The vibration dampers 234 are exemplified in a group of four vibration dampers 234. A single vibration damper 234 or a plurality of vibration dampers 234 can collectively be used without departing from the scope of the specification. The positions 282, the number and the grouping of the vibration dampers 234 on the bow 8 are for illustrative purposes. Indeed, the, the number and the grouping of the vibration dampers 234 can be adjusted according to optimizing the damping.

Figure 3:
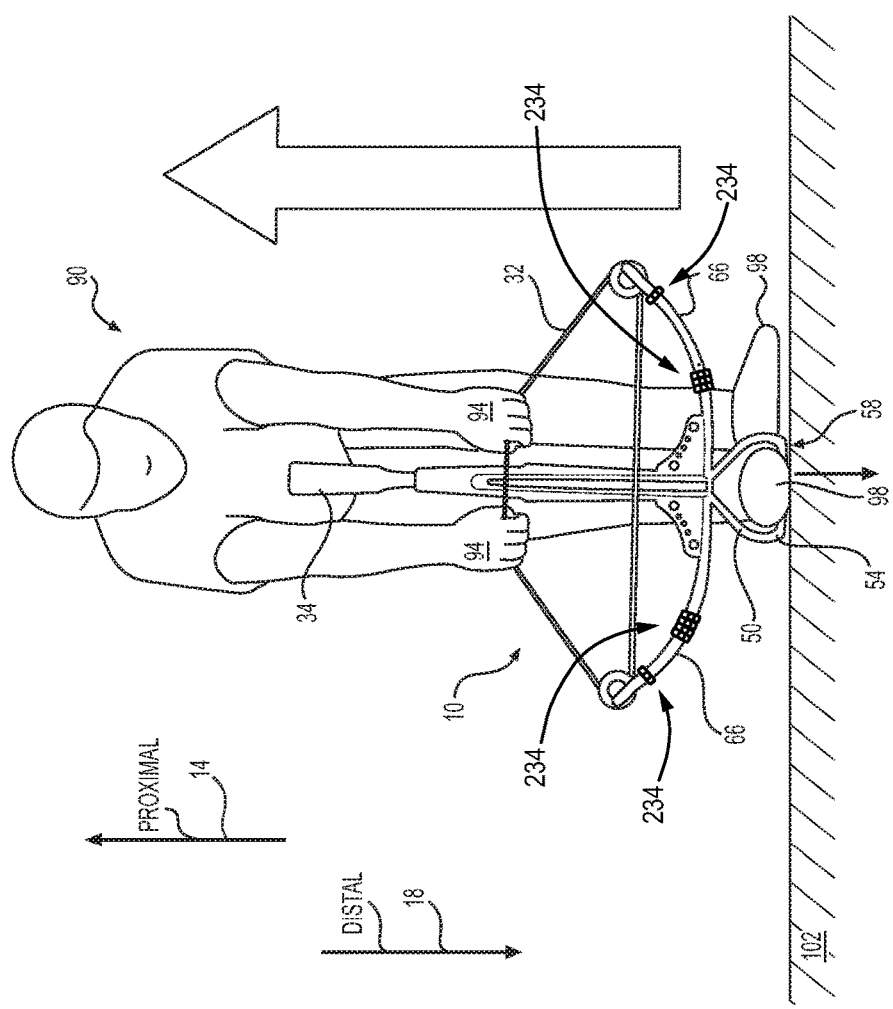
FIG. 3 is a schematic front elevational view of a person cocking a crossbow with vibration dampers secured thereon in accordance with at least one embodiment of the present invention.

Turning now to FIG. 3 illustrating a typical cocking by hand of a crossbow 10 by a user 90 using his/her hands 94 to pull the string 32 toward the proximal side 14 of the crossbow 10. Simultaneously, the user 90 is using one foot 98 on the stirrup 50 to apply pressure distally 18 toward the ground 102 to maintain the crossbow 10 on the ground 102 and counterbalance the tension applied proximally 14 to the string 32 to cock the crossbow 10.

Figure 4:
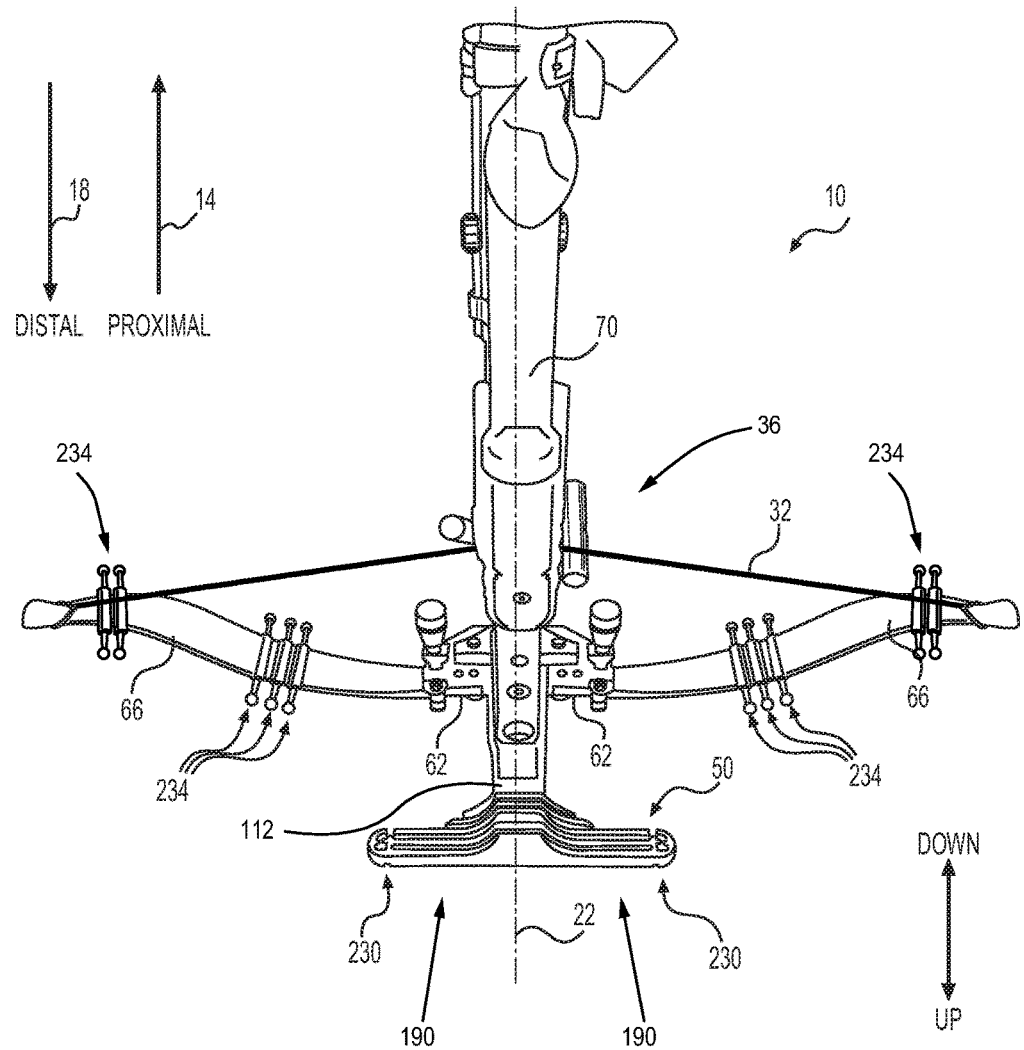
FIG. 4 is a top isometrical view of a crossbow with vibration dampers secured thereon in accordance with at least one embodiment of the present invention.
Figure 7:
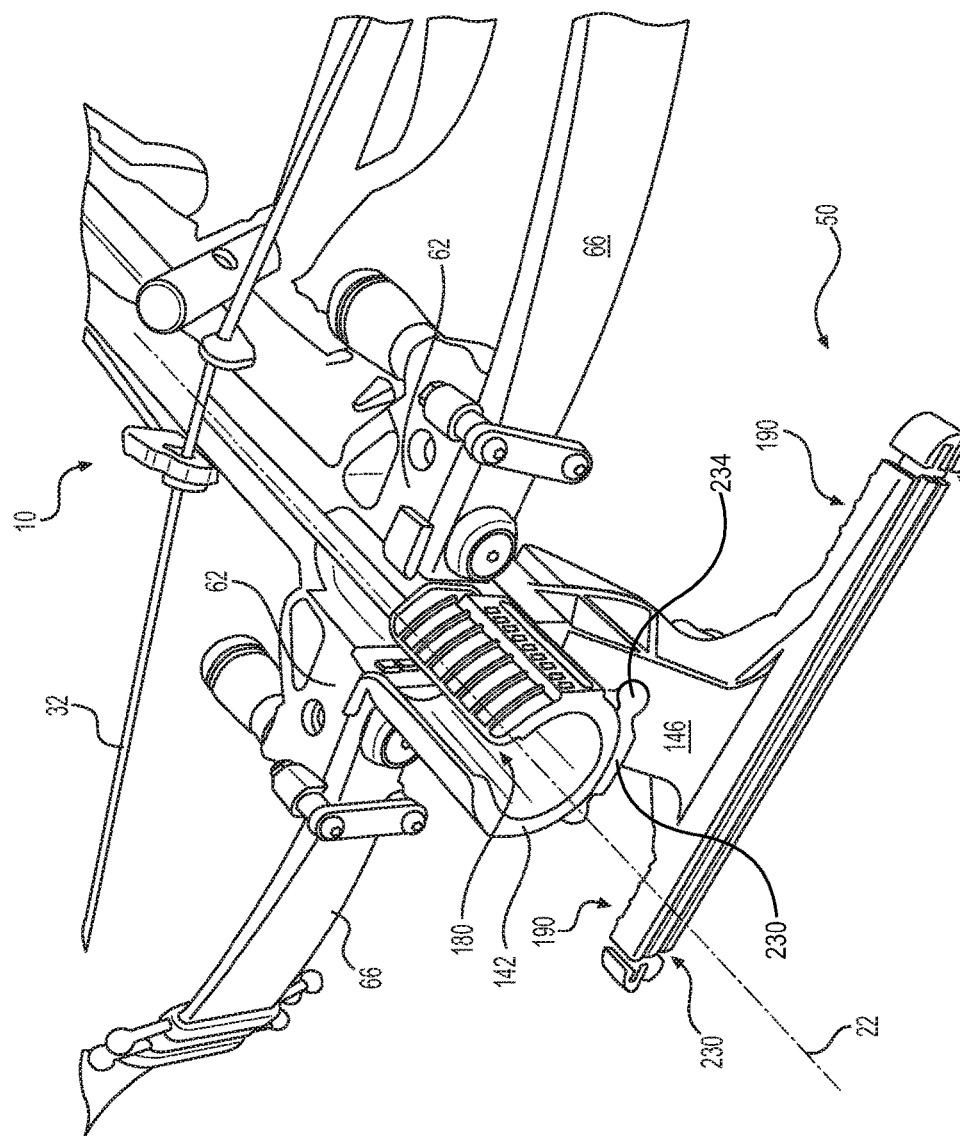
FIG. 7 is a bottom top left isometric view of an embodiment of a crossbow in accordance with an embodiment of the present invention.

In contrast, FIG. 4 throughout FIG. 7 illustrate a crossbow 10 equipped with a stirrup 50 having a configuration preventing an interference between the longitudinal axis 22 of the trajectory of the arrow 26 and the foot 98 of a user 90. In the present situation, the stirrup 50 comprises two foot-receiving portions 190 disposed in cantilever from a central portion 112 of the stirrup 50. The location of the stirrup 50 in embodiments of the present application is offset down from the longitudinal axis 22 of the arrow 26 and thus away from the barrel 46 and the limbs 66. The laterally disposed foot-receiving portions 190 are distanced from the arrow trajectory 22 by about 100 mm in the vertical direction, more precisely, by more than 110 mm and in some circumstances by more than 120 mm. Generally, the preferred configuration of the stirrup 50 renders rather impossible to place a foot or two feet in the trajectory 22 of the arrow 26. The feet are located away from the trajectory of the arrow 26 and should that not be enough, the support 146 and an arrow protector 142 of shape 150 are physically preventing a foot on the foot-receiving portion 190 to get in interference with the trajectory 22 of the arrow 26. The arrow protector 142 includes an opening 180 for receiving and engaging an arrow 26 therein.

Embodiments of the stirrup 50 can be sold with a new crossbow 10 or can be sold separately to retrofit an existing crossbow 10 without departing from the scope of the present application. The stirrup 50 has, preferably, a securing mechanism that is compatible with common securing mechanisms of existing crossbows 10. Securing the stirrup 50 of embodiments is generally using the existing fastening mechanism of crossbows 10 on the market.

Figure 5:
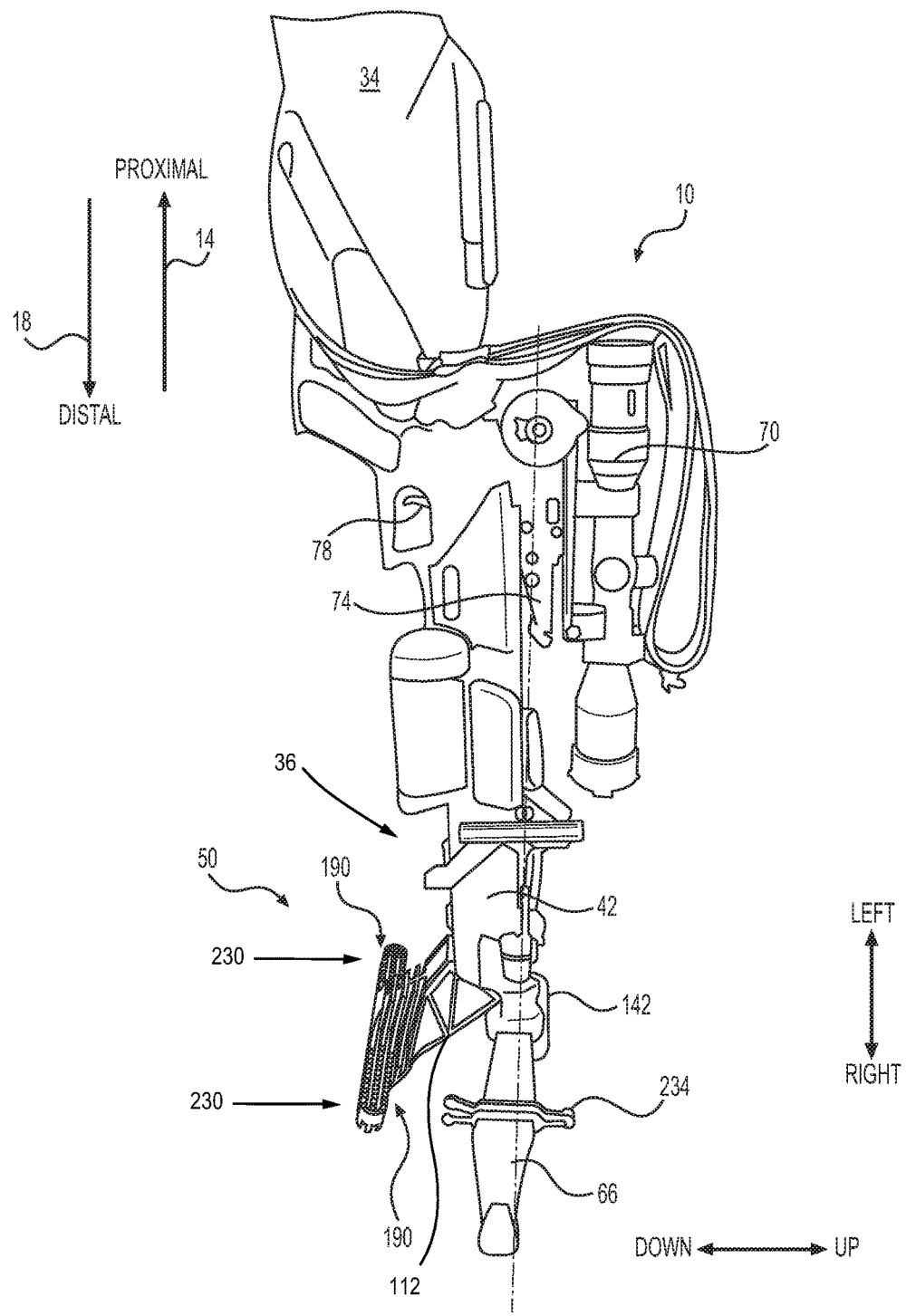
FIG. 5 is a right elevation view of a crossbow with vibration dampers secured thereon in accordance with at least one embodiment of the present invention.
Figure 8:
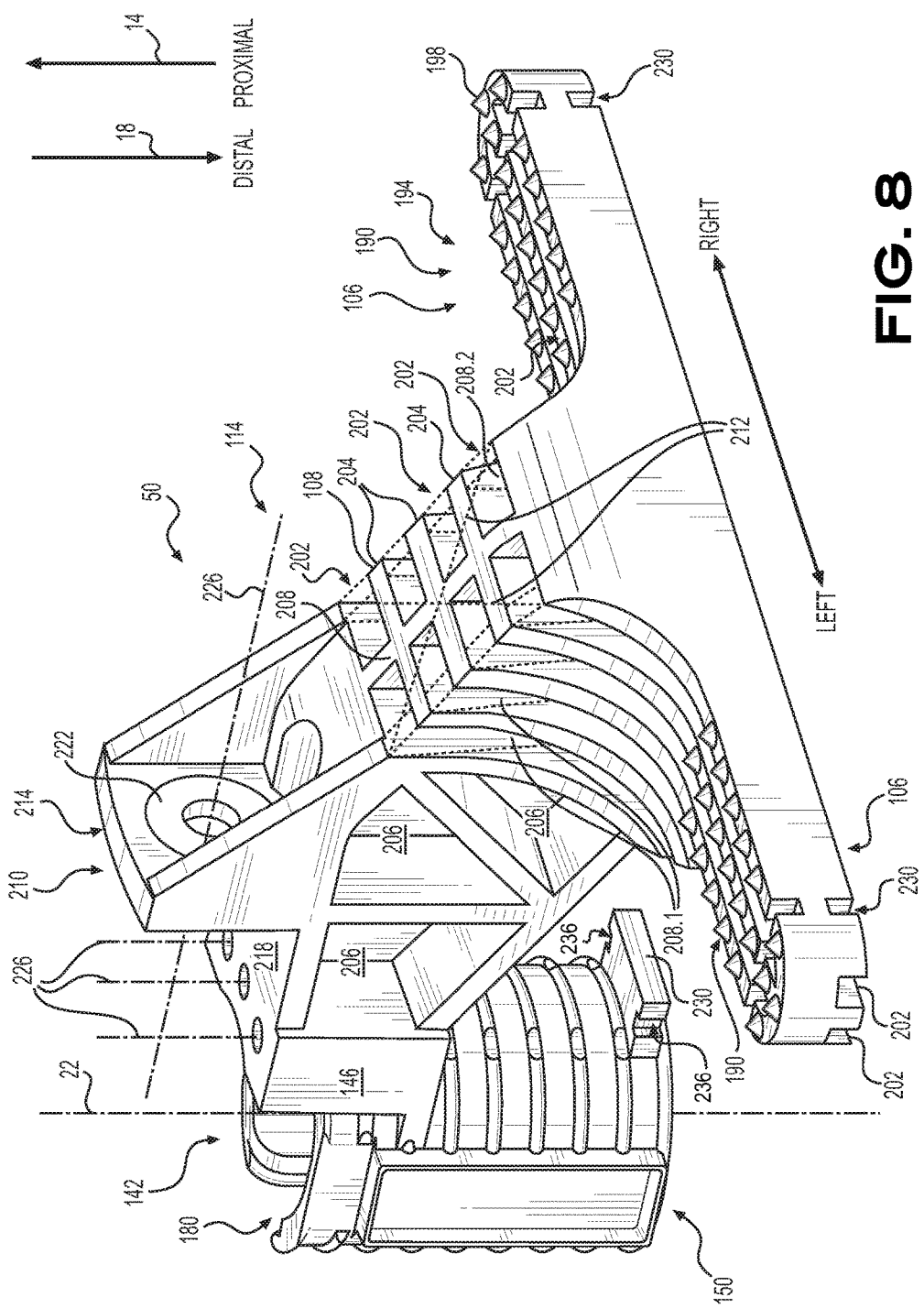
FIG. 8 is an isometric view of an exemplary stirrup in accordance with an embodiment of the present invention.
Figure 9:
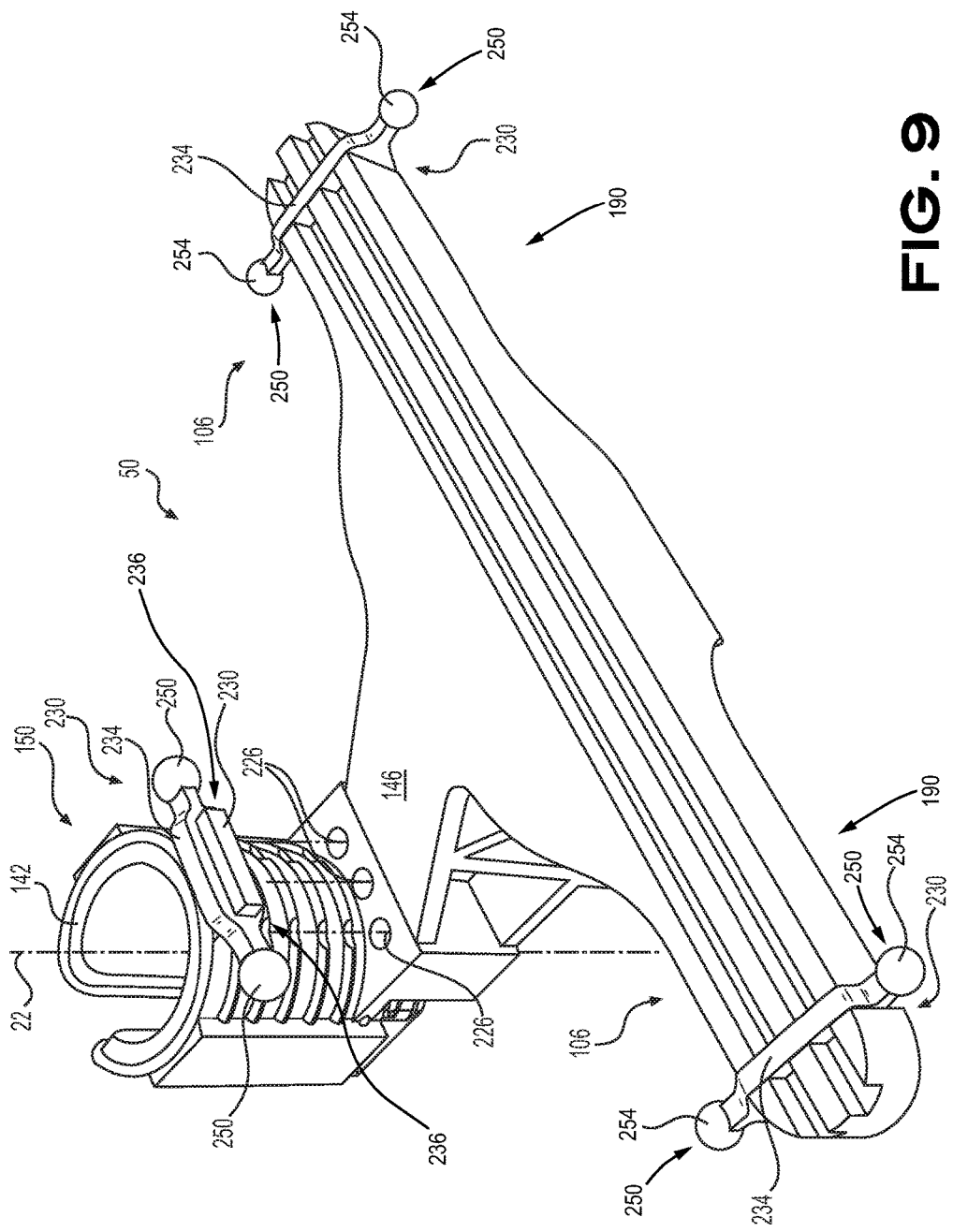
FIG. 9 is an isometric view of an exemplary stirrup outfitted with several exemplary vibration dampers of a stirrup with vibration dampers secured thereon in accordance with at least one embodiment of the present invention.

An optional arrow protector 142, illustrated in FIG. 5 throughout FIG. 9, is adapted to protect the broadhead 28 of the arrow 26 against foreign objects to prevent undesirable movement of the arrow 26 and to keep the arrow 26 in line with the longitudinal axis 22. The arrow protector 142 is also helpful to prevent injuries by contacting the sharp portions of the broadhead 28. The arrow protector 142 is secured to the distal end of the crossbow 10 via a support 146, as illustrated in FIG. 8. FIG. 5 throughout FIG. 9 illustrate a stirrup assembly 176 used in conjunction with an arrow protector 142 secured to the crossbow 10 via a support 146. The arrow protector 142 receives therein a portion of the arrow 26 to maintain and secure the arrow 26 (not shown) in place on the crossbow 10. The arrow protector 142 is intended to further protect the user 90 against being injured by contacting a razor-sharp broadhead 28.

The arrow protector 142 can be used to increase the crossbow 10 stability when positioned vertically in contact with the ground 102 for cocking the string 32 of the crossbow 10 or simply for vertically resting the crossbow 10 on the ground. The arrow protector 142 offers an additional point of contact with the ground 102 to increase the stability of the crossbow 10. With the embodied "T" shaped stirrup 50, the arrow protector 142 produces a three-contact-point (or triangular) support on the ground to ensure self-stability, or mechanical equilibrium, of the crossbow 10 resting on its distal end thereof. Preferably, the stirrup assembly 176 and the arrow protector 142 are collectively configurable to ensure they are of a proper length to be usable together.

Figure 6:
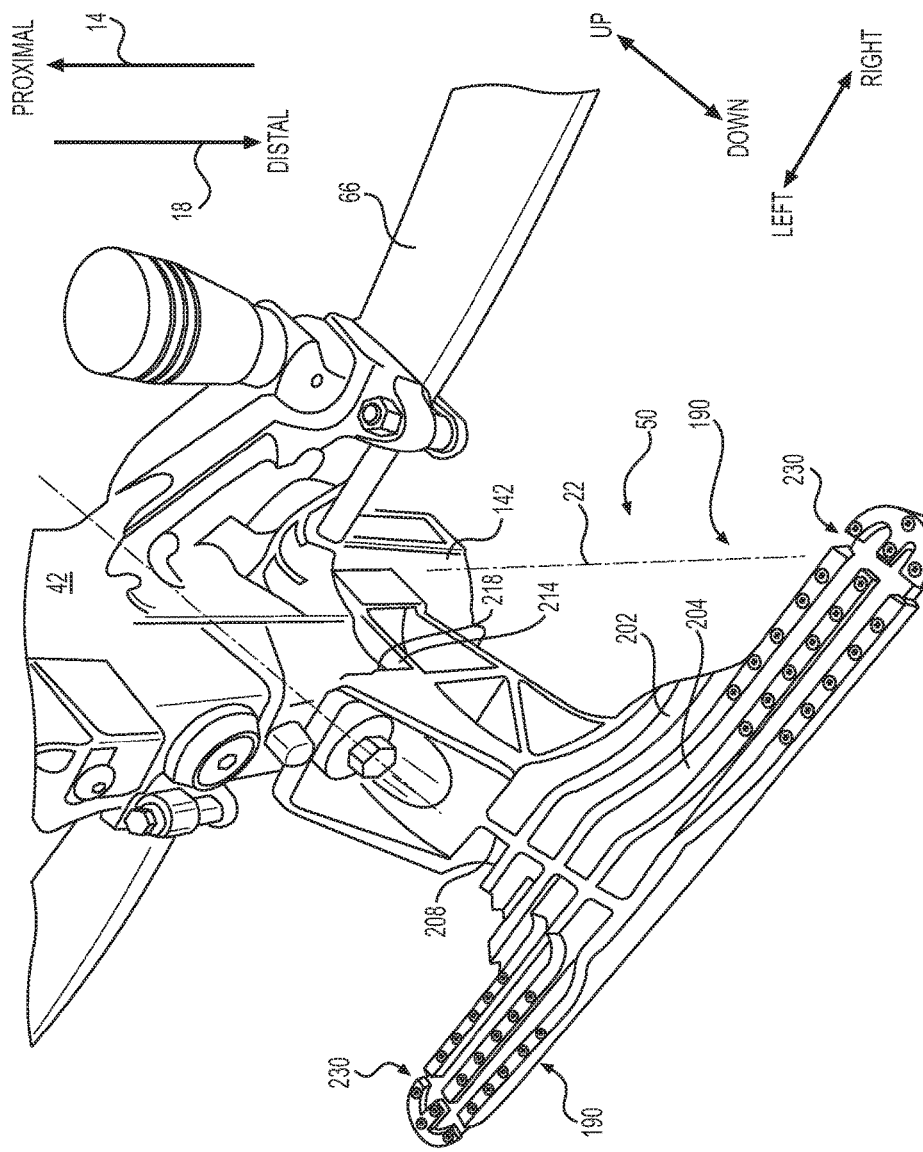
FIG. 6 is an isometric view of a crossbow with a stirrup in accordance with an embodiment of the present invention.

The illustrated stirrup 50 is adapted to accommodate one foot 98 or two feet 98 therein using different arrangements of parts. The embodiment exemplified in FIG. 6 illustrates a pair of opened foot-receiving portions 58. Each foot-receiving portion 190 can optionally include a vibration damper 234 receiver 230 to absorb vibrations from the cantilevered foot-receiving portion 190. The foot-receiving portion 190 is separated to ensure a more precise position of both feet 98 in the stirrup assembly 176. Those arrangements configured to accommodate two feet 98 have the benefit, inter alia, to provide additional stability to the crossbow 10. The two feet 98 are in a position to exercise an equal pressure on both sides of the longitudinal axis 22 via the stirrup assembly 176. The crossbow 10 is thus firmly maintained on the ground and into a stable and balanced position. Another benefit is to make it possible for user to cock the crossbow 10 in a seated posture.

FIG. 8 is illustrating an embodiment of the stirrup 50 with more details. The embodied stirrup 50 of FIG. 8 is made in a one-piece configuration 114 with injected material. The polymer material is can also include fibers therein to further reinforce the stirrup 50 or elements thereof. The polymer material offers several advantages, namely in terms of lightweight, low price for mass production of the stirrup 50 and also as a vibration dampening element. Alternatively, other materials like aluminum could be used to manufacture the stirrup 50. The stirrup 50 illustrated in FIG. 8 includes a first stirrup member 106 including two open foot-receiving portions 190 disposed on lateral sides of the longitudinal axis 22 locating the feet 98 of a user away from the trajectory of the arrow 26. The two foot-receiving portions 190 of the stirrup 50 are equipped with anti-slip features 194 embodied as an array of molded small spikes 198. The foot-receiving portions 190 further include grooved sections 202 adapted to ensure a strong contact between the stirrup 50 and the feet 98 of a user on one side and the ground 102 on the opposite side when the stirrup 50 is in the cocking position. The grooved sections 202 are also extending in a second stirrup member 108 to lighten the stirrup 50 by using material discretely where required for mechanical strength. A series of ribs 204 are interconnected by a junction rib 208 to increase the stiffness of the stirrup 50. A plurality of parallel junction ribs 208.1, 208.2, illustrated in dotted lines, could be embodied to increase the stiffness of the part. Other patterns of ribs 204 and junction ribs 208 could be used to provide the desired stiffness and mechanical strength to the stirrup 50. A pattern of junction ribs in "X" 212 schematically illustrated with dotted lines could be used to add torsion stiffness. One can note that the second stirrup member 108 also includes recessed sections 206 to further lighten the stirrup 50 by using material discretely where required for mechanical strength between the foot-receiving portions 190, the arrow protector 142 and the crossbow 10.

The stirrup 50 illustrated in FIG. 8 includes an optional arrow protector 142 that is covering the broadhead 28 of the arrow 26 hence further protecting the feet 98 of a user 90 from the broadhead 28 of the arrow 26. The stirrup 50 can be embodied with only the foot-receiving portions 190 and, alternatively, with the arrow protector 142. The arrow protector 142 can optionally be a distinct part and be added if desired to the stirrup 50. The longitudinal length of the arrow protector 142 preferably covers the broadhead 28. The position, configuration and length of the arrow protector 142 is providing a third contact point with the ground in addition with the two contact points with the ground offered by the two foot-receiving portions 190. This layout produces a triangular ground-contacting configuration with three contact points providing stability of the crossbow 10 when resting on the ground on its distal side, supported by the stirrup 50 and the arrow protector 142 for cocking the crossbow 10.

The stirrup 50 further includes a crossbow receiving portion 210 adapted for contacting and attaching the stirrup 50 to the distal end of the crossbow 10 with two cooperating angled planes 214, 218 (illustrated orthogonal to each other) ensuring a strong connection with the crossbow 10. The plane 214 can include a reinforcing sleeve 222 providing additional strength to the stirrup when the fastener is secured therethrough. The reinforcing sleeve 222 can be made of aluminum or other materials offering sufficient strength.

Fasteners are used to secure the stirrup 50 to the crossbow 10 through a series of holes 226.

As mentioned above, crossbows 10 are generating significant vibrations when releasing the energy stored therein for propelling an arrow 26. However, a low level of noise is preferable when hunting. The stirrup 50, as better seen in FIG. 8, optionally includes a plurality of vibration damper receivers 230. The vibration damper receivers 230 are sized and designed to receive vibration dampers 234 thereon. In a possible embodiment exemplified in FIG. 9, rubberized elements 238 can be used as vibration dampers 234 and be installed on the stirrup 50 for reducing the vibration level of the bow 8 or crossbow 10. In the present embodiment, the vibration damper receivers 230 are located near the ends of the foot-receiving portions 190 to dissipate vibrations traveling toward the ends of the foot-receiving portions 190 before they transform into audible noise. A third vibration damper receiver 230 is located in the center of the stirrup 50 between the arrow protector 142 and the foot-receiving portions 190 preferably near the end of the arrow protector 142. The vibration dampers 234 are going to be secured within the groove shaped by the vibration damper receivers 230 in the foot-receiving portions 190. The third vibration damper receiver 230 is embodied as a protrusion extending from the arrow protector 142 including concave portions 236 sized and designed to receive therein a vibration damper 234. The concave portions 236 could be altered or replaced by other alternate embodiments adapted to receive and secure thereto one or more vibration dampers 234. It remains within the scope of the present application to add, remove and change the configuration, the number and the locations of the vibration damper receivers 230 to adapt to specific factors and designs.

Figure 10:
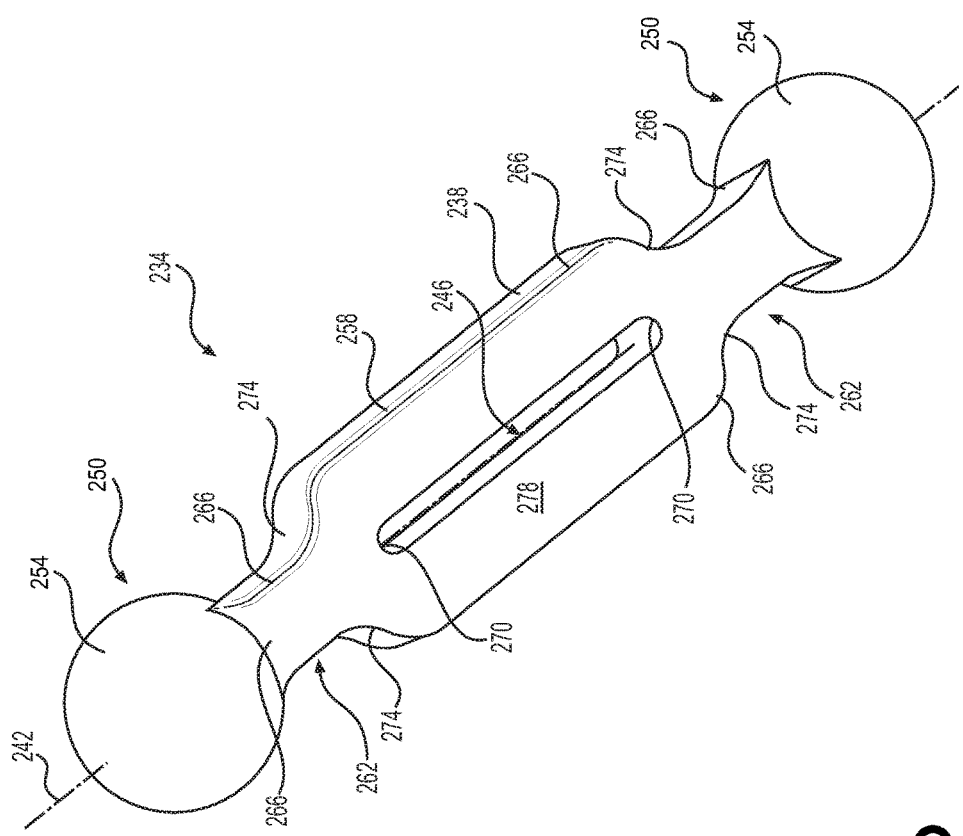
FIG. 10 is an isometric view of an exemplary vibration damper in accordance with an embodiment of the present invention.
Figure 11:
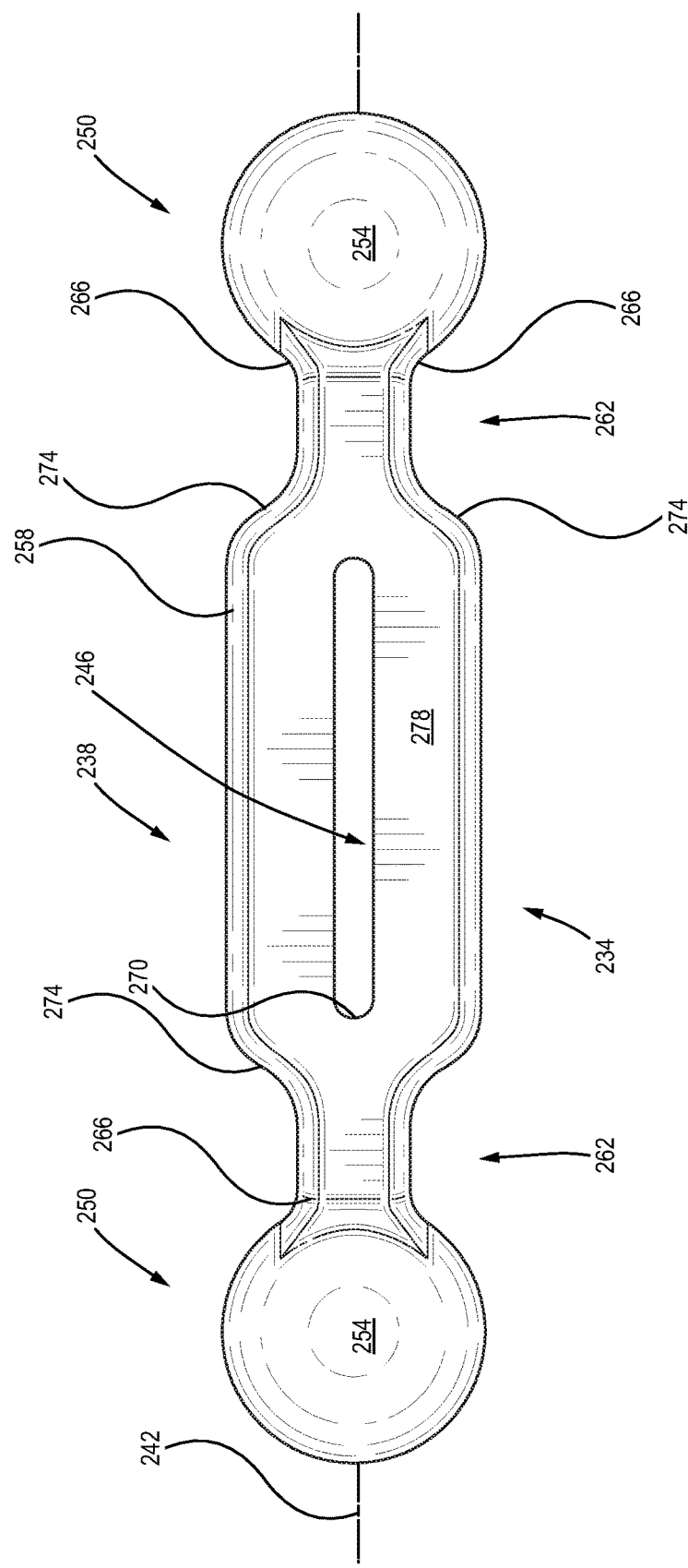
FIG. 11 is a top view of an exemplary vibration damper in accordance with an embodiment of the present invention.
Figure 12:
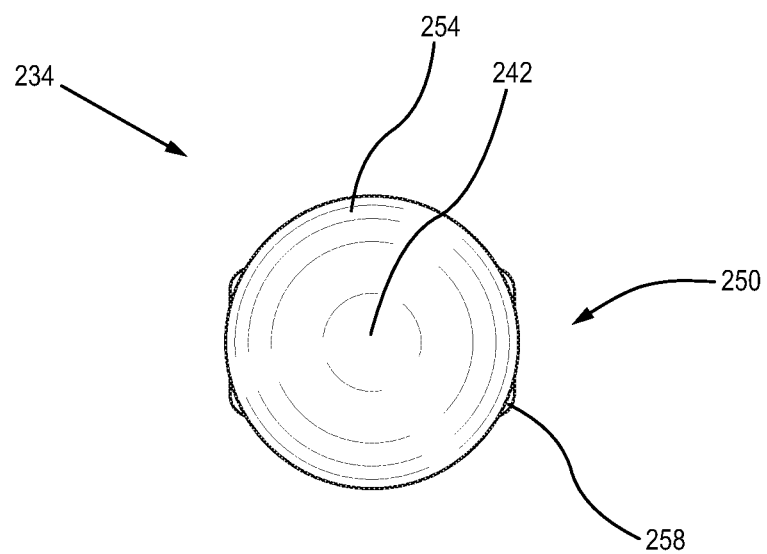
FIG. 12 is front elevational view of an exemplary vibration damper in accordance with an embodiment of the present invention.
Figure 13:
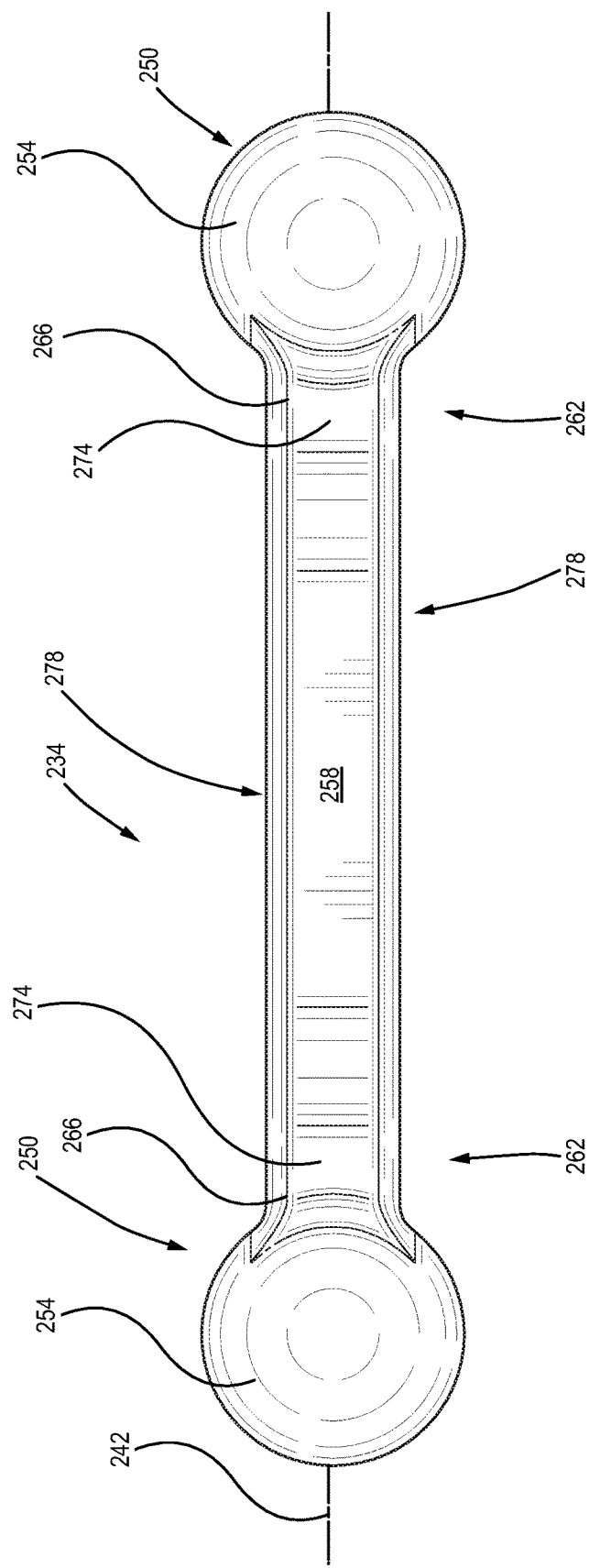
FIG. 13 is a side elevational view of an exemplary vibration damper in accordance with an embodiment of the present invention.

A vibration damper 234 is exemplified in FIG. 10 throughout FIG. 13. The vibration damper 234 is preferably made of vibrations dampening material like rubber. The vibration damper 234 is designed with an elongated shape along a longitudinal axis 242. The vibration damper 234 can be embodied in various longitudinal lengths in accordance with its position on the stirrup 50 or on the crossbow 10. A soft rubber, natural rubber, polymer or elastomer material having sufficient elasticity is preferable to ensure strong contact and proper positioning on the stirrup 50 or the crossbow 10. A sticky material can be advantageous to keep the vibration dampers 234 in place. The contact with the stirrup 50 or the crossbow 10 needs to be sufficient to prevent any undesirable change of location when the vibration damper 234 is subjected to vibrations.

The vibration damper 234 includes a central opening 246 that is sized and designed to fit on the desired vibration damper receivers 230. The central opening 246 is illustrated with a longitudinal shape adapted to match and properly cooperate with the vibration damper receivers 230 of the illustrated embodiment. At least one protruding portion 250 is axially extending on at least one side of the vibration damper 234 to vibrate and dissipate vibration energy with its flexible construction and lower the vibration noise that could be caused by the release of the tension in the string 32 and the propulsion of the arrow 26. In embodiments thereof, the protruding portion 250 includes a mass 252 at a distal axial end thereof. The mass 252 is embodied at a distance from the central opening 246 with a geometrical shape 254. The geometrical shape 254 can be shaped in different shape. As illustration for the geometrical shape 254. It can be a spherical shape as illustrated on FIG. 23 or a cubic shape as illustrated on FIG. 24. However, the mass 252 can be embodied as a protruding portion 252 of a size adapted to act as a mass 252 and capable of absorbing vibration. The protruding portion 252, for example, of an axial length of about 5 mm can absorb vibrations. The protruding portion 250 of a length of more than 5 mm can generally absorb vibrations with a different behavior. The length of the protruding portion 250 can be adjusted in respect of the vibration damper 234 size, material and configuration without departing from the scope of the present specification.

The protruding portion 250 is connected to the body 258 of the vibration damper 234 with an interconnecting portion 262. In embodiments, the interconnecting portion 262 has a reduced transversal section compared with the body 258 and the mass 252 to transmit vibrations to the vibration damper 234. In turn, the vibration damper 234 has a larger size to include more material ensuring efficient vibration absorption. The vibration damper 234 is embodied as a generally geometrical shape 254 in the present embodiment however other shapes and sizes are contemplated by the present application. The protruding portions 250 are also used to stretch the vibration damper 234 to enlarge the central opening 246 and install the vibration damper 234 on the limb 66, or on the vibration damper receiver 230. The geometrical shape 254 that is illustrated is larger than the interconnecting portion 262 and offers a good grip to manually install the vibration damper 234 at its desired position.

A series of radiuses 266 are managing soft transitions between the different sides of the vibration damper 234. A radius 270 is included on each longitudinal extremity of the central opening 246 to prevent local stress concentration. External radiuses 274 are disposed between the body 258. Opposed and substantially planar sides 278 are defining the lateral shape of the vibration damper 234. The thickness of the body 258 is adapted to match the thickness of the vibration damper receiver 230 and the elasticity of the vibration damper 234 allows installation of the vibration damper 234 thereon while firmly securing the vibration damper 234 on the desired vibrating portion of the stirrup 50 and/or the crossbow 10. For example, one or more vibration damper 234 can be secured to the limbs 66 and positioned at any desired locations on the limbs 66.

The combined interaction between the stirrup 50 disposed at a distal 18 end of the crossbow 10 is acting as an energy harvesting structure that can harvest energy from the vibrations caused by the functioning of the crossbow 10. The harvesting of mechanical energy from vibrations is using inertial energy harvesting that generally relies in the resistance of a mass to acceleration, and kinematic energy harvesting which directly couples the energy harvester, the stirrup 50, to the relative movement of the source, the crossbow 10. The polymer stirrup 50 of embodiments therein is mainly provided by the viscoelastic character of polymers. Elastomer and rubber are also used as vibration damping material due to their viscoelasticity.

Figure 14:
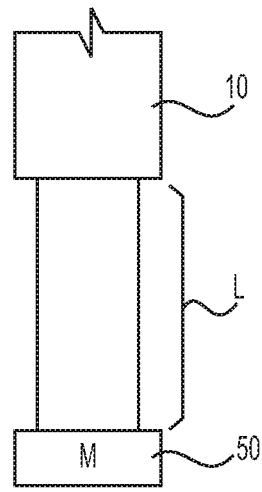
FIG. 14 is a schematic illustration of a mass-ended cantilevered beam in accordance with an embodiment of the present invention.
Figure 15:
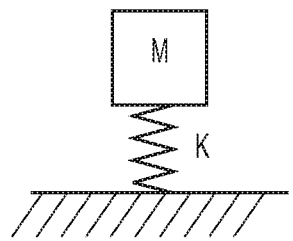
FIG. 15 is a schematic illustration of a mass-ended cantilevered beam treated as a simple lumped-mass SDOF (single degree of freedom) system in accordance with an embodiment of the present invention.
Figure 16:
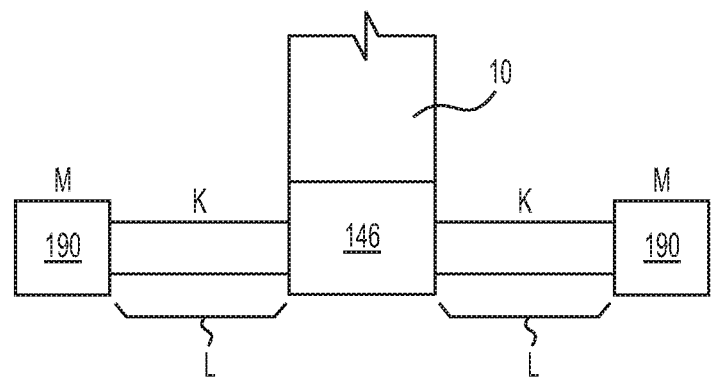
FIG. 16 is a schematic illustration of the conceptual cantilever vibration absorbers of an exemplary stirrup or vibration absorber in accordance with an embodiment of the present invention.
Figure 17:
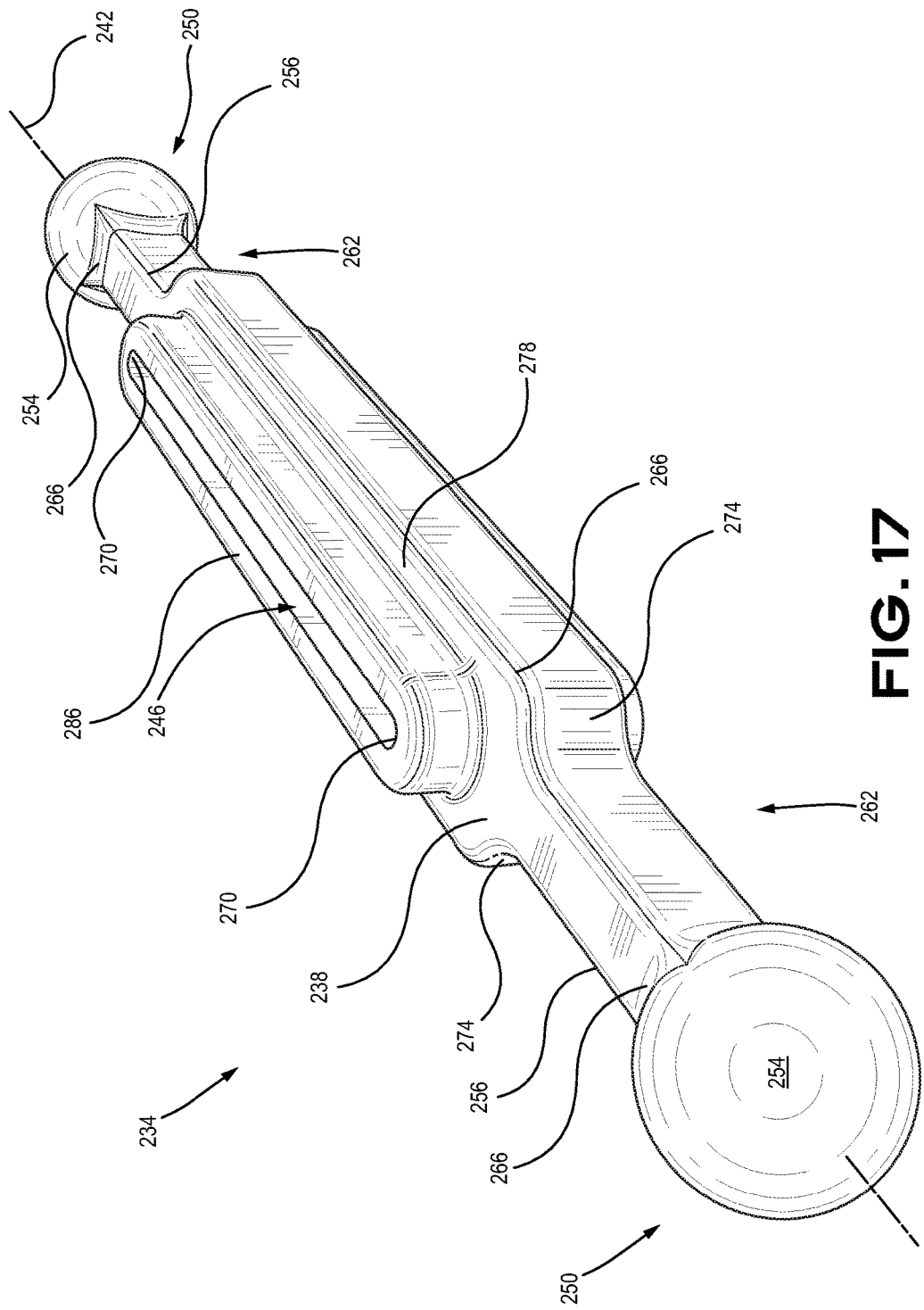
FIG. 17 is an isometric view of an exemplary vibration damper in accordance with at least one embodiment of the present invention.

The stirrup 50 and crossbow 10 structure can be seen as a spring design for vibration absorbing use. In particular, the "mass-ended cantilevered" produced by the foot-receiving portions 190 extending distally in front of the crossbow 10, offers a very simple realization of a spring-mass system for use as a vibration absorber. Such a mass-ended cantilevered beam is illustrated schematically in FIG. 14 where the cantilever stirrup 50 is connected to the crossbow 10. The hence considered mass-ended cantilevered beam may be treated as a simple lumped-mass SDOF (single degree of freedom) system as shown in FIG. 15 having a mass M and a spring stiffness K. The conceptual vibration absorber can also be refined to consider the two foot-receiving portions 190 extending distally in front of the crossbow 10 as illustrated in FIG. 16 as cantilever vibration absorbers.

The vibration damper 234 is embodied with material having vibration absorption/damping capability. In an embodiment, Vistalon™ ethylene propylene diene (EPDM) rubber is used. Performance advantages of Vistalon™ EPDM include ozone resistance, excellent electrical insulation, long service life in extreme environmental conditions and sustained flexibility. Vistalon™ EPDM can be loaded with high levels of filler for cost-effective compounding. It is UV resistant and can sustain wide temperature variations. An embodiment uses EPDM with 50 Shore A hardness to allow vibration absorption/damping. In another embodiment, natural rubber is used. An embodiment uses natural rubber with 50 shore A hardness. In another embodiment, silicon is used. An embodiment uses silicon with 50 shore A hardness. In another embodiment, nitrile is used. An embodiment uses nitrile with 50 shore A hardness. Alternatively, the material in use can have a duro varying from 35 to 60 to obtain a desired damping, depending on the configuration of the bow 8 and the crossbow 10. Other materials capable of providing proper absorption/damping of vibrations are also contemplated by the present invention. Generally, the material should be mate and of dark color, finish that can be considered "tactical", to prevent undesired light transmission when hunting, although other colors are encompassed by the present application.

The stirrup 50 shape and material is also used to increase the vibration absorption/damping of crossbows 10. The exemplified stirrup 50 is preferably made of polymer material that can be charged with reinforcement fibers therein to further increase its mechanical strength due to the significant mechanical load applied on the stirrup 50 when cocking the crossbow 10. The type of material provides vibration absorption/damping properties. The type of reinforcement fibers and the amount added in an injected material are also variables adapted to be set to obtain a precise vibration absorption behavior. In embodiments of the invention, the polymer can be selected from the following: Nylon, Acrylic and ABS. A preferred embodiment uses Nylon (Nylene 4114-14 HSL PA-66) with about 15% fibers therein. Other recipes can be used to provide sufficient mechanical properties without departing from the scope of the invention.

Figure 18:
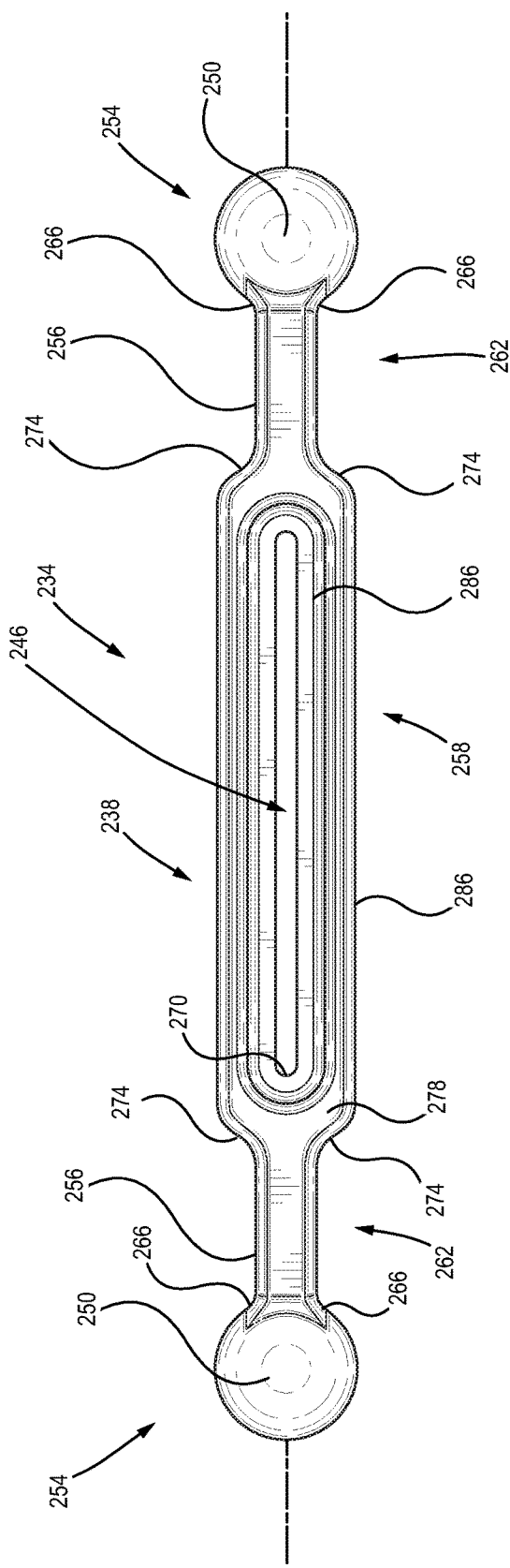
FIG. 18 is a side view of an exemplary vibration damper in accordance with at least one embodiment of the present invention.
Figure 19:
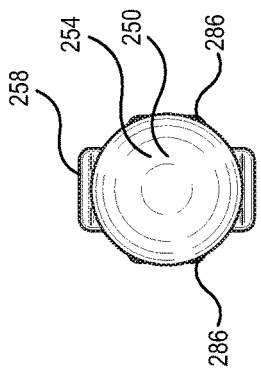
FIG. 19 is front elevational view of an exemplary vibration damper in accordance with at least one embodiment of the present invention.

Another vibration damper 234 embodiment is shown in FIG. 18 throughout FIG. 21. The illustrated vibration damper 234 includes lateral extended portions 286 adapted to increase the amount of material in contact with the part on which the vibration damper 234 is mounted to ensure a strong contact preventing any undesired relative movement thereof. Rubberized materials can "stick" to the vibrating part or the vibration damper receiver 230 on which the vibration damper 234 is mounted. The additional contact provided by the extended portions 286 helps increasing securing the vibration damper 234 on the vibrating part. Further, the extended portions 286 are sized to distance adjacent vibration dampers 234 thus allowing free movements of the protruding portions 250. The width 290 of the body 258 of the vibration damper 234 is larger than the width 294 of the protruding portions 250. The intervening gap 298 is used to prevent contacts between adjacent protruding portions 250 and, in the present situation, the cantilevered masses 252 embodied in geometrical shapes 254.

Illustratively, four adjacent vibration dampers 234 are illustrated in FIG. 22. The four adjacent vibration dampers 234 are mounted on a limb 66 and the elasticity of the material of the vibration dampers 234 allows, by stretching and applying a tension on the limb 66 to secure the vibration dampers 234 over the limb 66 and sustain vibrations of the limb 66 without moving on the limb 66. One can appreciate the protruding portions 250 are not touching each other and are allowed to freely oscillate and vibrate to absorb and damp vibrations of the limb 66. The number of vibration dampers 234 illustrated is four and other configurations using a different number of vibration dampers 234 are encompassed by the present application. The number of vibration dampers 234 can be adjusted function of the location on the limb 66, the quantity of vibrations to damp, the required mass of protruding portions 250 and the type of material used to manufacture the vibration dampers 234 and its intrinsic material properties.

The vibration dampers 234 can be sold individually, in group as a kit, retrofitted on existing bows 8 and crossbows 10 or sold OEM with a new bow 8 or crossbow 10. The present application also encompasses a method of damping vibrations for a bow 8 and a crossbow 10. A method to install the vibration damper 234 is also considered within the scope of the present application.

Figure 23:
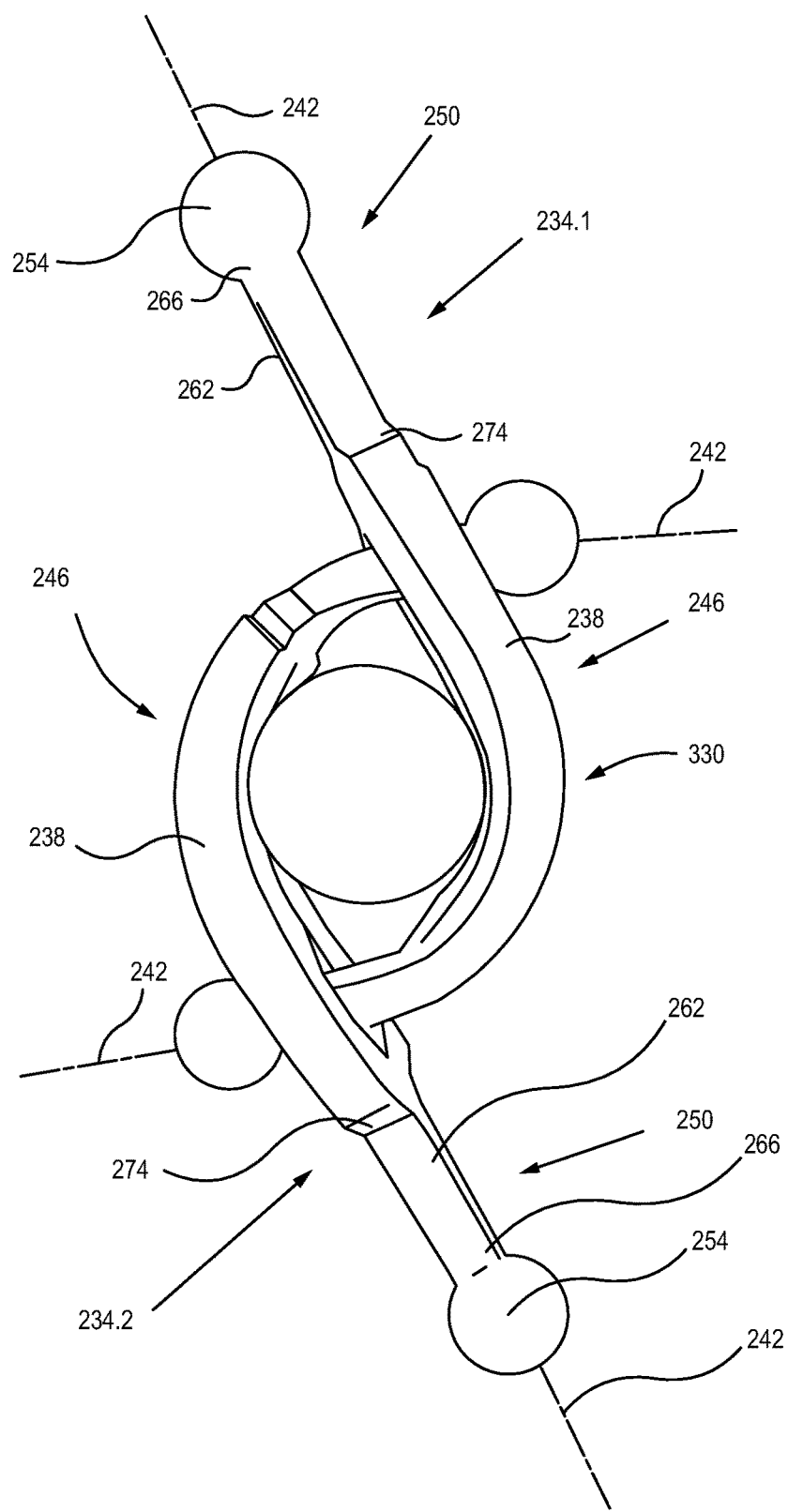
FIG. 23 is a side view of a plurality of vibration dampers assembled together to circle a periphery of an object in accordance with at least one embodiment of the present invention.
Figure 24:
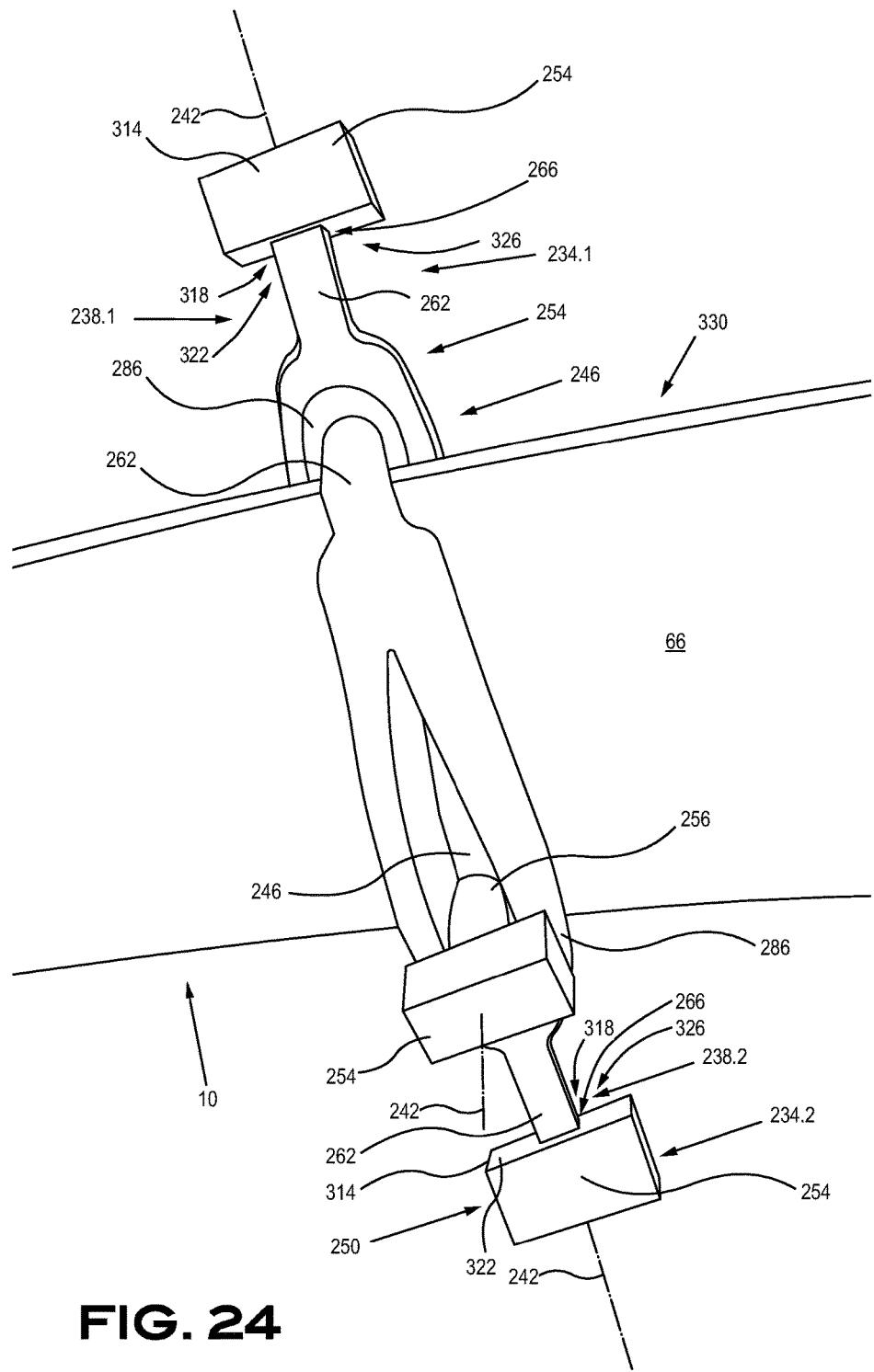
FIG. 24 is a front view of two vibration dampers assembled together to circle a periphery of a limb without having to disassemble the string of a limb of a bow and crossbow in accordance with at least one embodiment of the present invention.

An additional embodiment is illustrated in FIG. 23 and FIG. 24. A plurality of vibration dampers 234 can be used collectively to created a vibration damping structure 330. A pair of vibration dampers 234.1 and 234.2 is interconnected together in a vibration damping structure 330 to facilitate the installation of vibration dampers 234 on portions of the bow and crossbow 10 that has an enclosed structure preventing the installation of the vibration damper 234 on the bow 8 and crossbow 10. For instance, a limbs 66 and string 32 assembly prevents the insertion of a vibration damper 234 on the limb 66 through the central opening 246 of the vibration damper 234. A skilled reader would understand it is possible to slide one or more vibration dampers 234, putting the limb 66 in the central opening 246 if the string 32 is disassembled from the limbs 66. This mandatory removal of the string 32 from the limbs 66 is requiring a lot of strength, if not specialized tools, and is rather complicated, if not difficult. Assembling a pair of vibration dampers 234 together around the limb 66 does not require to remove the string 32 from the limbs 66 and can be advantageously be done by most people and can also be done without requiring tools or super-human strength. A first assembly configuration is illustrated in FIG. 23 and FIG. 24; the geometrical shape 254 of a first vibration damper 234.1 is passed through the central opening 246 of the second vibration damper 234.2. The half assembled pair of vibration dampers 234 are then put on the limb 66 and the geometrical shape 254 of the second vibration damper 234.2 is passed through the central opening 246 of the first vibration damper 234.1 to circle the limb 66 and secure the pair of vibration dampers 234 in place on the limb 66. The assembly is secured on the limb 66 with the stretching of the interconnecting portions 262. The illustrated embodiment presents a geometrical shape 254 used to interlock the counterpart vibration damper 234. Other shapes can be used. A square shape could be used to interlock the counterpart vibration damper 234. Preferably, a shape having an edge ensuring efficient interlocking, like a "T" shape, could be used instead of the geometrical shape 254 used in the illustrated embodiment.

Still referring to FIG. 24, the cantilever portion 250 of an alternate embodiment, at a distal end thereof, includes a stopper element 314 schematically illustrated as a dotted rectangle. The stopper element 314 has a shape adapted to interlock another vibration damper 234 when inserted through the central opening 246. The stopper element 314 has a proximal shape 318 sized and designed to efficiently block the counterpart vibration damper 234. The proximal shape 318 can be embodied as a planar surface 322 preferably orthogonal 326 to the interconnecting portion 262. The engaging shape of the stopper element 314 could also be embodied in any other shape ensuring proper interconnection between two vibration dampers 234. Also, the central opening 246 can be embodied differently than the exemplified illustration without departing from the scope of the present invention. The vibration damper 234 can alternatively include an opening 246, a hook or a shape adapted to receive a portion of another vibration damper 234 and ensure durable interconnection therebetween that can sustain the loads and the vibrations generated by the bow 8 or the crossbow 10.

Figure 25:
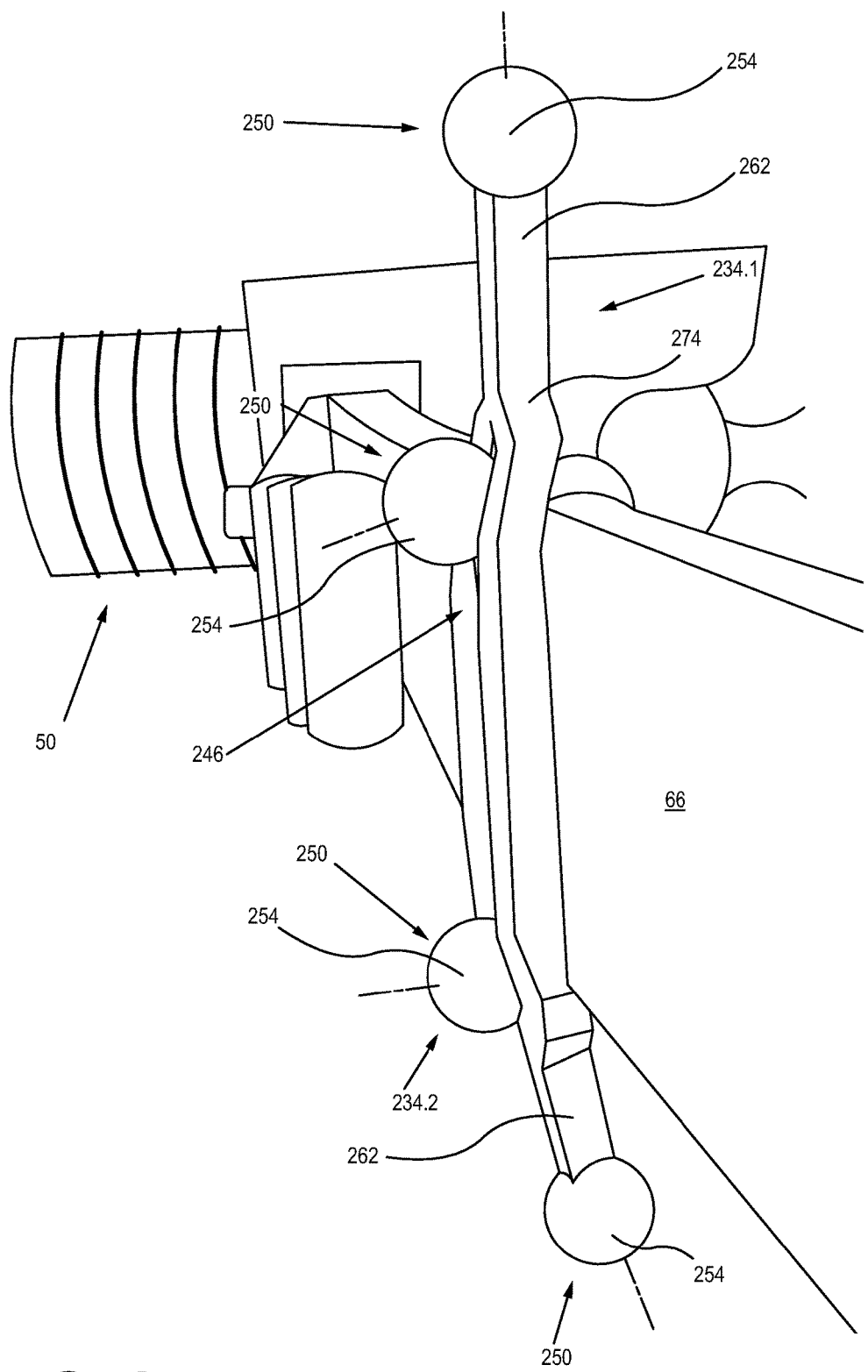
FIG. 25 is a side view of two vibration dampers assembled together to circle a periphery of a limb without having to disassemble the string of a limb of a bow and crossbow in accordance with at least one embodiment of the present invention.

FIG. 25 illustrates another alternate embodiment using a pair of vibration dampers 234.1, 234.2 interconnected together to facilitate the installation of vibration dampers 234 on portions of the bow and crossbow 10 that has an enclosed structure preventing the installation of the vibration damper 234 on the bow and crossbow 10 as explained above. A second assembly configuration is illustrated in FIG. 25; the geometrical shape 254 on one side of the second vibration damper 234.2 is passed through the central opening 246 of the first vibration damper 234.1. The half assembled pair of vibration dampers 234 are then installed on the limb 66 and the geometrical shape 254 on the other side of the second vibration damper 234.2 is passed through the central opening 246 of the first vibration damper 234.1 to circle the limb 66 and secure the pair of vibration dampers 234 in place on the limb 66. The assembly is secured on the limb 66 with the stretching of the two interconnecting portions 262 of the second vibration damper 234.2. Other combinations of vibration dampers 234.1 and 234.2 are interconnected together to facilitate the installation of vibration dampers 234 on portions of the bow and crossbow 10 can be appreciated by a skilled reader and remain within the scope of the present invention.

Figure 26:
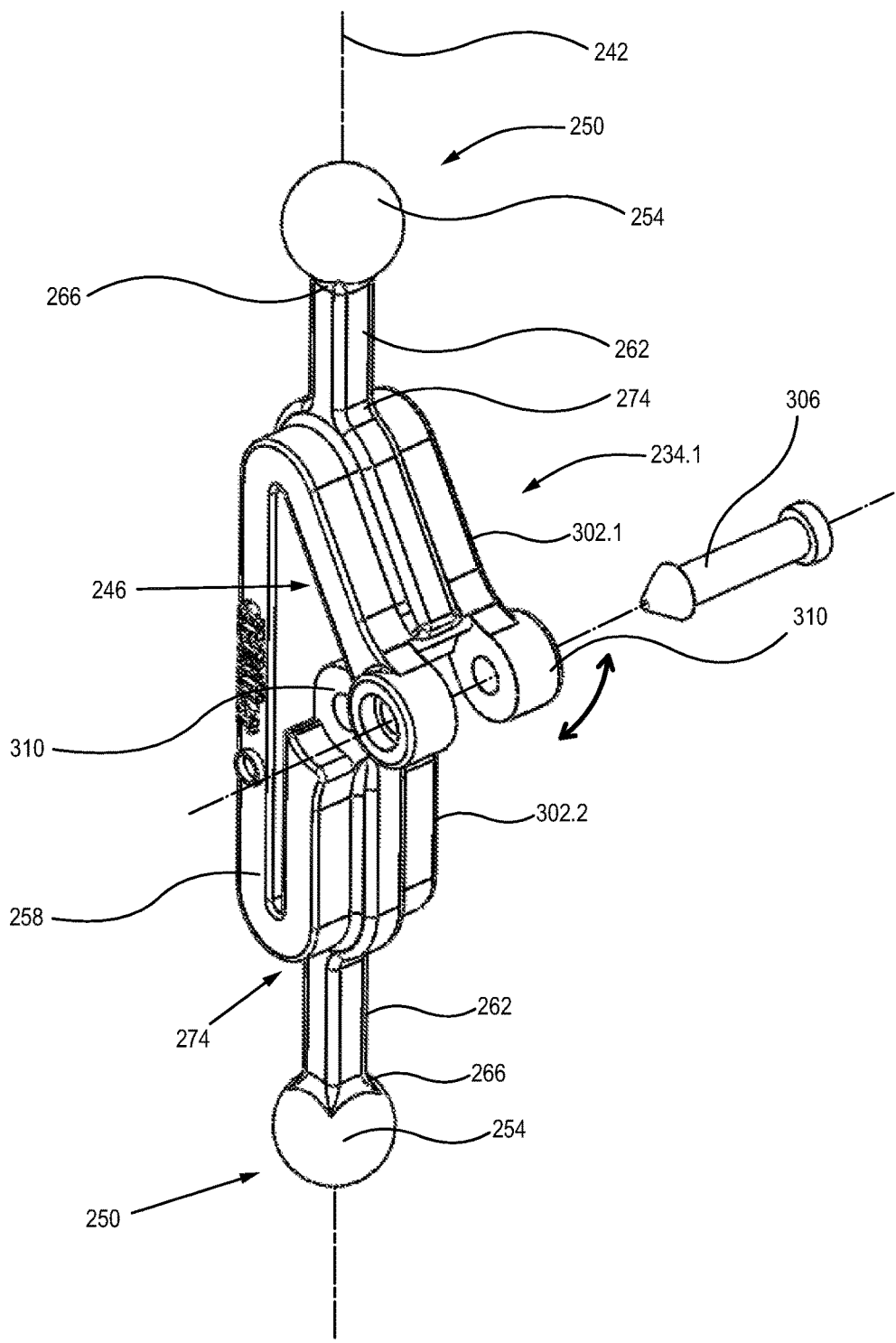
FIG. 26 is an isometric view of a clipping vibration damper in accordance with at least one embodiment of the present invention.
Figure 27:
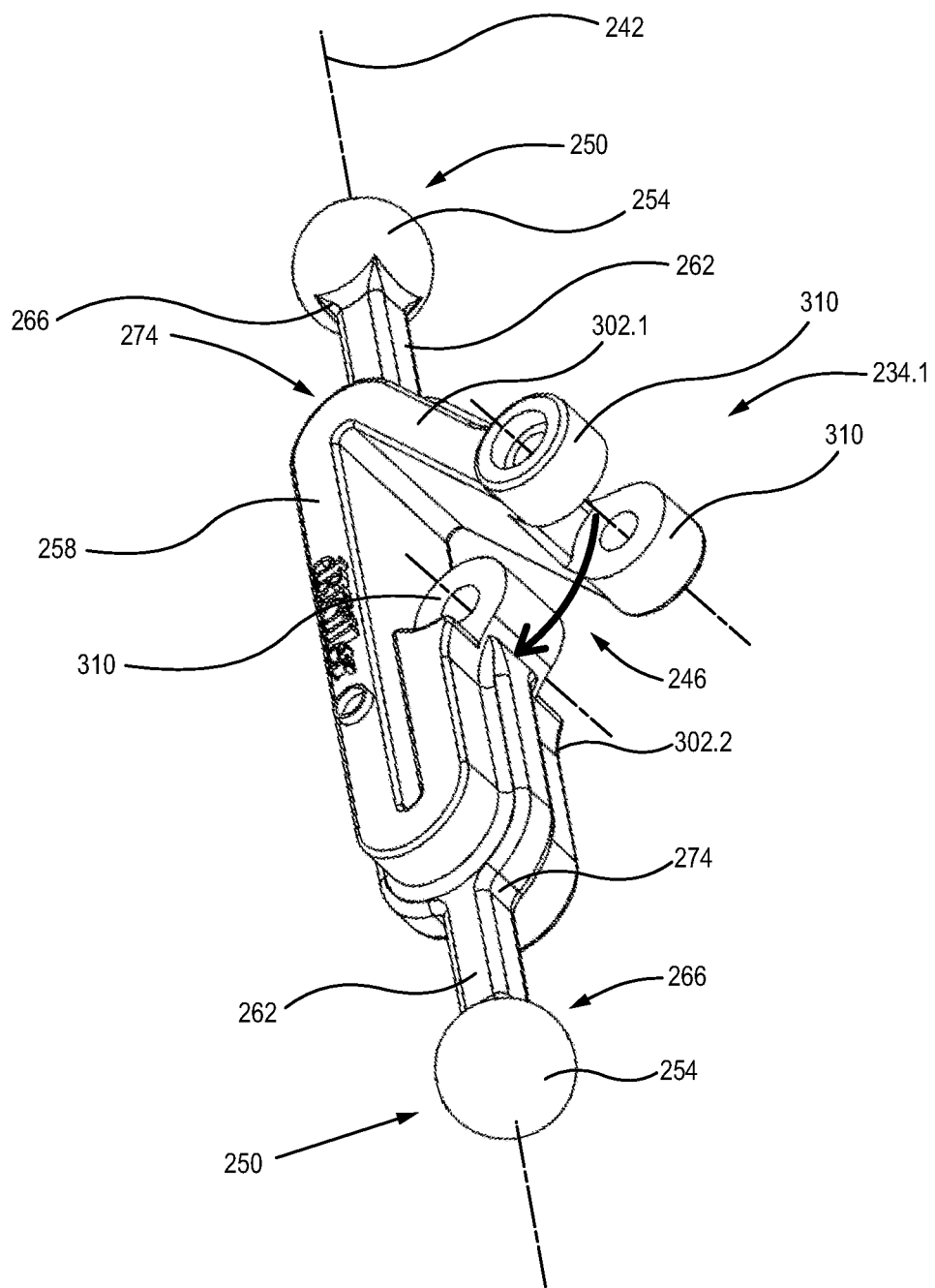
FIG. 27 is an isometric view of a clipping vibration damper in accordance with at least one embodiment of the present invention.
Figure 28:
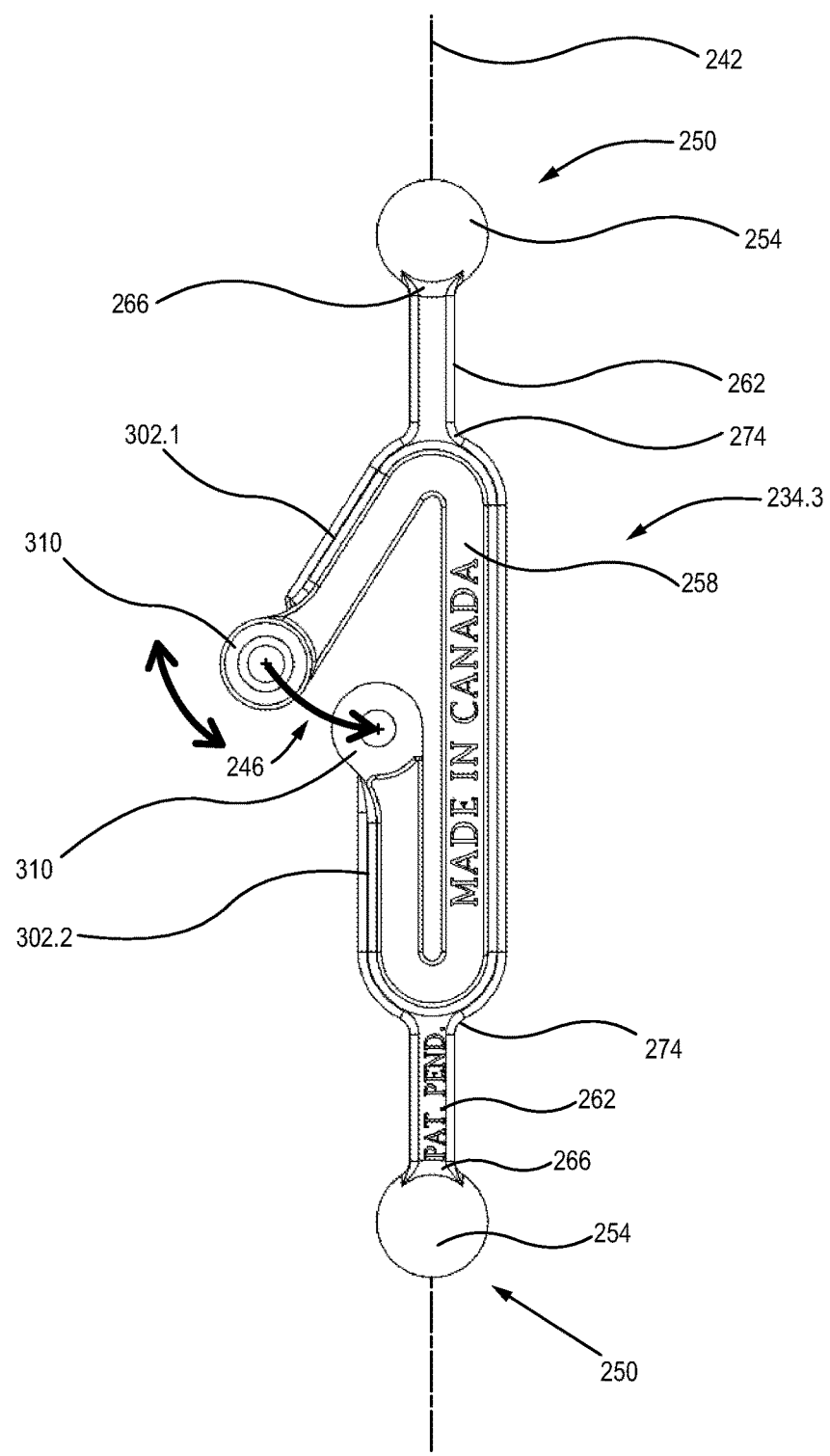
FIG. 28 is a right side elevational view of a clipping vibration damper in accordance with at least one embodiment of the present invention.
Figure 29:
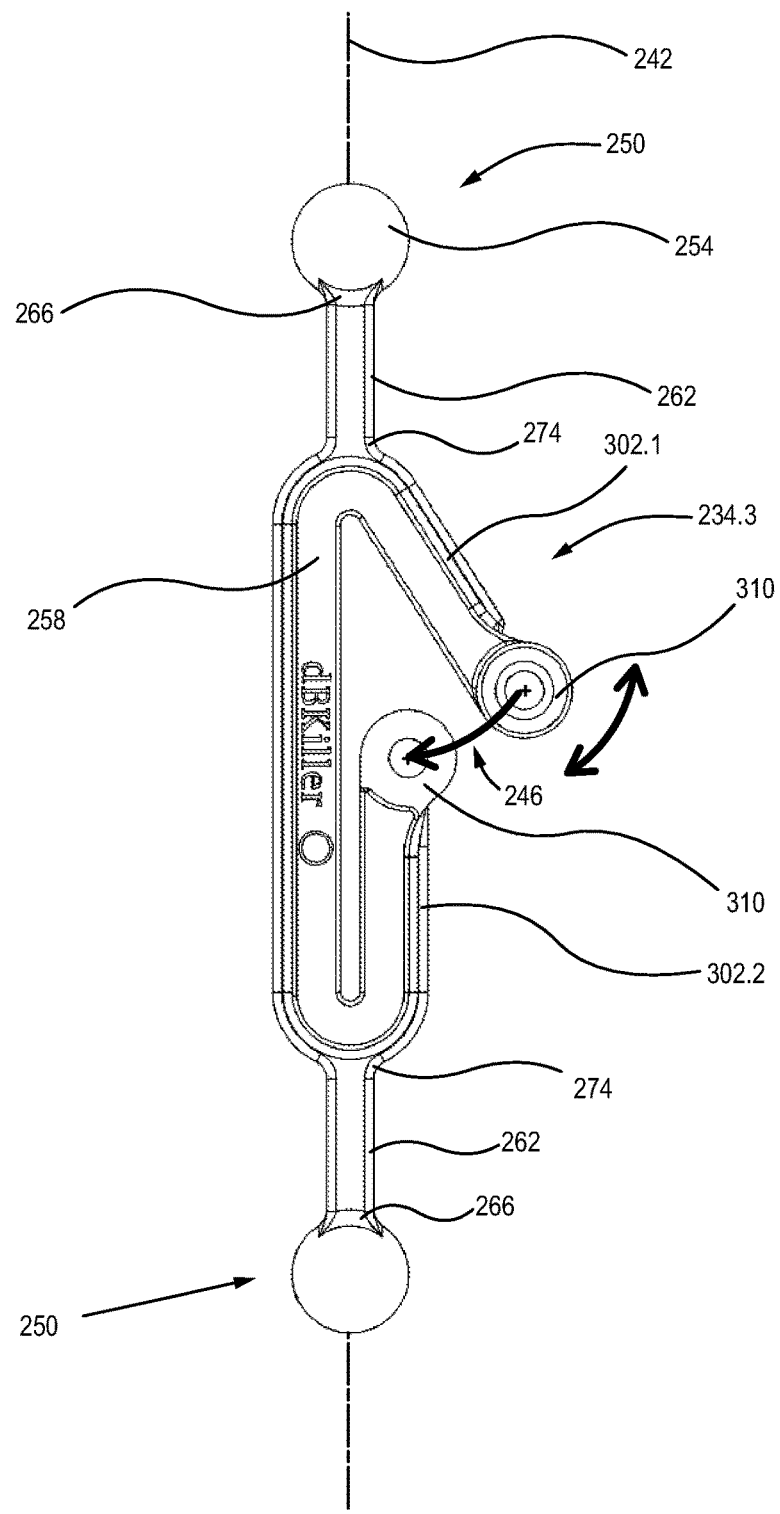
FIG. 29 is a left side elevational view of a clipping vibration damper in accordance with at least one embodiment of the present invention.
Figure 30:
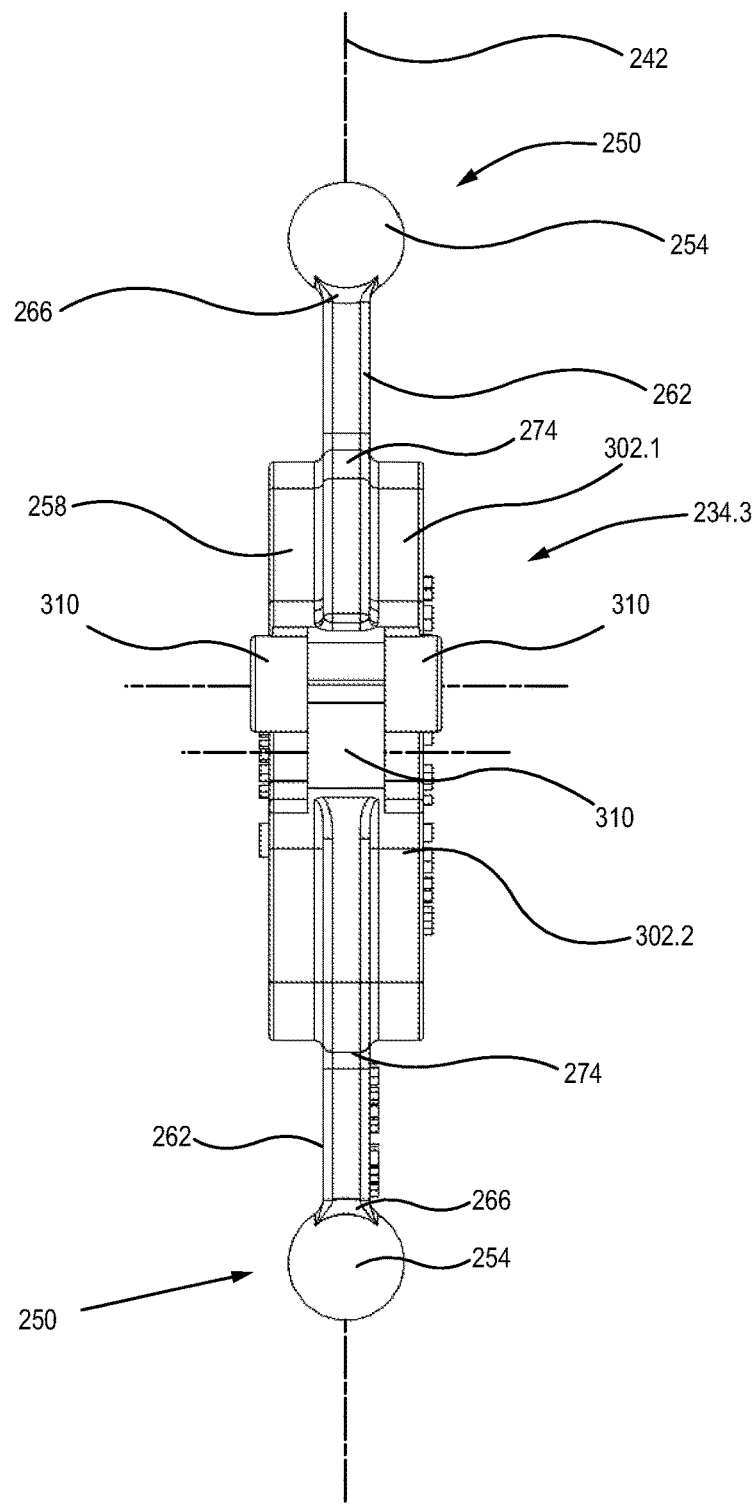
FIG. 30 is a front elevational view of a clipping vibration damper in accordance with at least one embodiment of the present invention.
Figure 31:
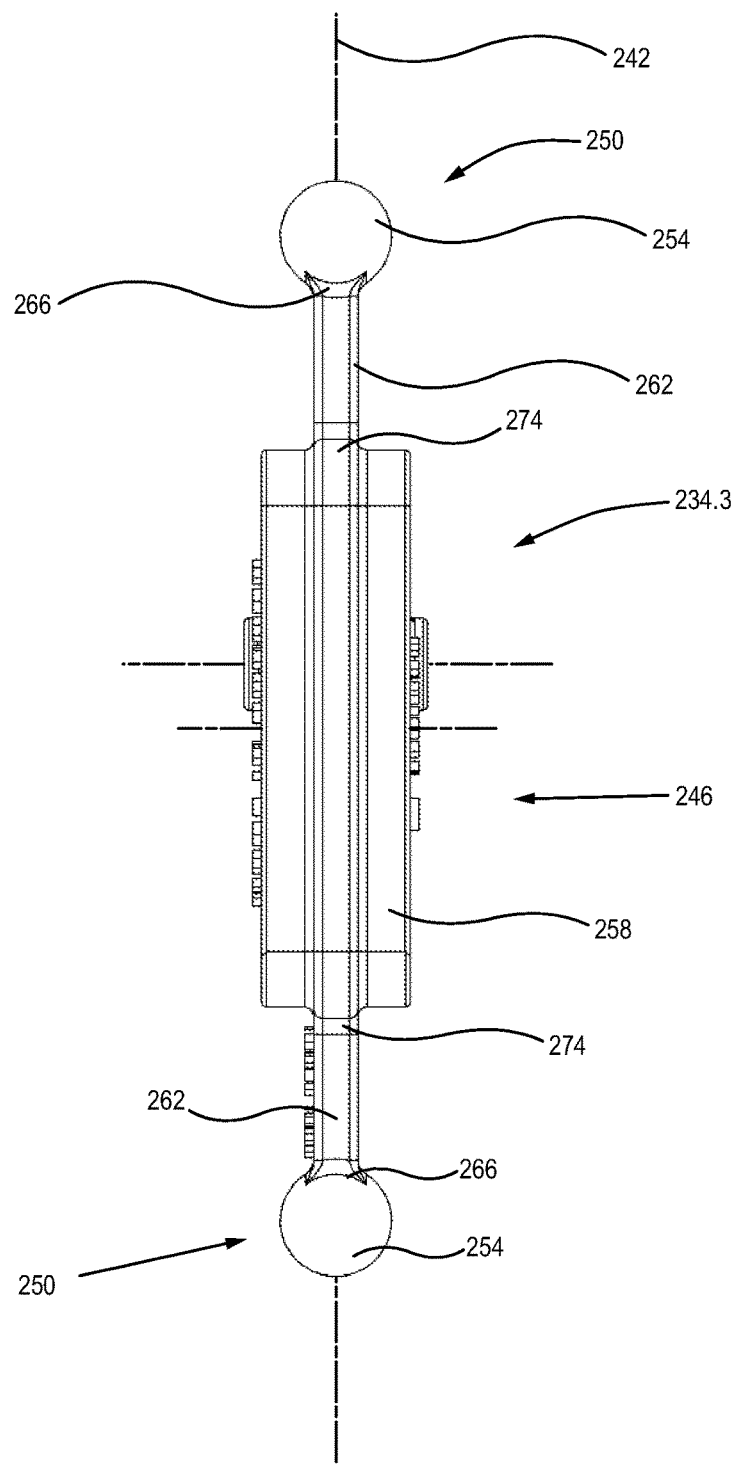
FIG. 31 is a back elevational view of a clipping vibration damper in accordance with at least one embodiment of the present invention.
Figure 32:
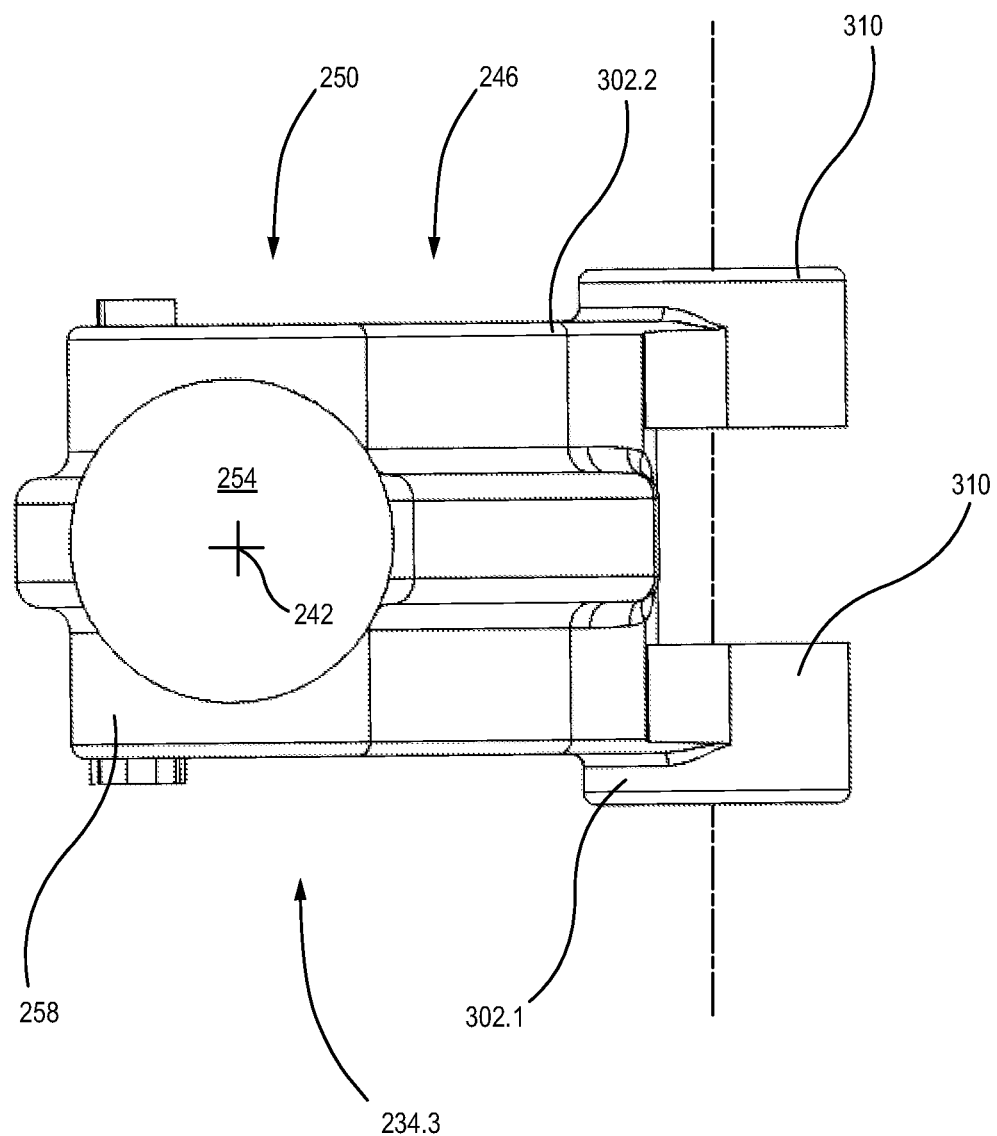
FIG. 32 is a top plan view of a clipping vibration damper in accordance with at least one embodiment of the present invention.
Figure 33:
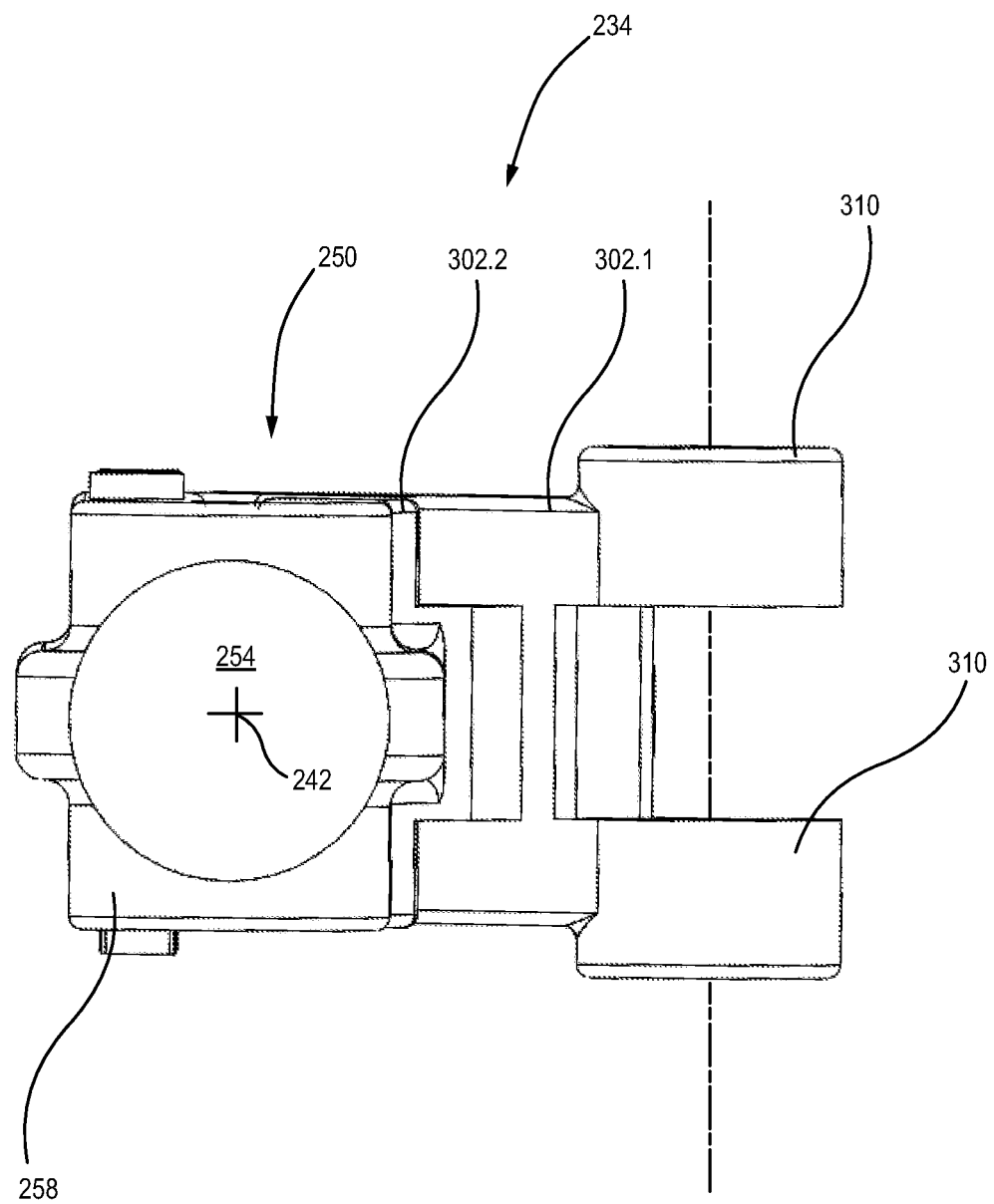
FIG. 33 is a bottom plan view of a clipping vibration damper in accordance with at least one embodiment of the present invention.

An additional embodiment is depicted in FIG. 26 throughout FIG. 33. The additional embodiment illustrates an alternate solution to allow securing a vibration damper 234 on a limb 66 without requiring to disassemble the string 32 from the limbs 66. An open vibration damper 234.3 is sized and designed with an open central opening 246. One side of the body 258 forming the central opening 246 is designed in two disconnectable body parts 302.1, 302.2. The two body parts 302.1, 302.2 allow for a limb 66 to be inserted in the central opening 246 without having to remove the string 32 from the limb 66. The two body parts 302.1, 302,2 can be assembled, permanently or temporarily, with a lock member 306. The lock member 306 is configured to engage a plurality of connectors 310 located on one respective and adjacent ends of the two body parts 302.1, 302.2. The lock member 306 can be embodied as a polymer stem or any other fasteners adapted to perform the task.

The first body part 302.1 is embodied in a semi-open position inviting the insertion of a portion of the bow and crossbow 10 therein. The first body part 302.1 could be embodied in a non-open position or in a more open position depending on the size of the portion of the bow and crossbow 10 to secure in the central opening 246.

The first body part 302.1 is equipped with a pair of connectors 310 and the second body part 302.2 is equipped with a single connector 310 to establish a strong double shear connection with the lock member 306.

The description and the drawings that are presented above are meant to be illustrative of the present invention. They are not meant to be limiting of the scope of the present invention. Modifications to the embodiments described may be made without departing from the present invention, the scope of which is defined by the following claims:

What is claimed is:

1. A vibration absorber comprising:
    an elongated body about a longitudinal axis thereof, the elongated body including two longitudinal ends thereof;
    an elongated opening in the elongated body; and
    a pair of protruding portions axially extending in cantilever from respective longitudinal ends of the elongated body, the pair of protruding portions absorbing vibrations when the vibration absorber is secured to a vibrating object,
    wherein each of the protruding portion includes a mass disposed at a distal end thereof, wherein each of the protruding portions includes an elongated interconnecting portion, the elongated interconnecting portion being connected to the elongated body at a first end thereof and being interconnected to the mass at a second end thereof, the elongated interconnecting portion including a smaller transversal section than a transversal section of the mass.

2. The vibration absorber of claim 1, wherein the vibration absorber is made in a single piece.

3. The vibration absorber of claim 1, wherein the vibration absorber includes a polymer.

4. The vibration absorber of claim 1, wherein the longitudinal body further comprises an opposed pair of transversal extended portions disposed on respective transversal sides of the elongated body.

5. The vibration absorber of claim 4, wherein the transversal extended portions are sized and designed to space apart two adjacent vibration absorbers to prevent the masses of respective adjacent vibration absorbers to contact each other when a plurality of vibration absorbers is transversally secured, adjacent to each other, on the vibrating object.

6. The vibration absorber of claim 1, wherein the vibrating object is securable in the elongated opening.

7. The vibration absorber of claim 1, wherein a plurality of vibration absorbers is securable together to circumscribe the vibrating object by interconnecting protruding portions with an elongated opening.

8. The vibration absorber of claim 1, wherein the elongated body includes an elongated opening including two parts secured together with a lock member.

9. A string-equipped apparatus for propelling a projectile, the string-equipped apparatus comprising:
    a body including a longitudinal axis;
    a pair of limbs transversally affixed on a distal end of the body, the pair of limbs being adapted to move between a distal relaxed position and a proximal tensed position for accumulating energy thereof;
    a string mounted on respective transversal sides of the pair of limbs in a substantially orthogonal direction in respect with the body for tensing the pair of limbs when proximally longitudinally pulled away from the distal end and blocking the pair of limbs in the tensed position for longitudinally propelling an arrow along an arrow trajectory in a longitudinal and distal direction when the string is selectively released to bring back the pair of limbs the distal relaxed position;
    a stirrup disposed on the distal end of the body, the stirrup including a foot-receiving portion for securing the distal end of the body to the ground with a foot applying pressure on the stirrup toward the ground when cocking the string of the string-equipped apparatus; and an elongated body about a longitudinal axis thereof, the elongated body including two longitudinal ends thereof;

an elongated opening in the elongated body; and a pair of protruding portions axially extending in cantilever from respective ends of the elongated body, the pair of protruding portions absorbing vibrations when the vibration absorber is secured to a vibrating object.

10. The string-equipped apparatus of claim 9, wherein each of the protruding portion includes a mass disposed at a distal end thereof.

11. The string-equipped apparatus of claim 10, wherein the vibration absorber is made in a single piece.

12. The string-equipped apparatus of claim 10, wherein the vibration absorber includes a polymer.

13. The string-equipped apparatus of claim 10, wherein each of the protruding portions includes an elongated interconnecting portion, the elongated interconnecting portion being connected to the elongated body at a first end thereof and being interconnected to the mass at a second end thereof, the elongated interconnecting portion including a smaller transversal section than a transversal section of the mass.

14. The string-equipped apparatus of claim 10, wherein the longitudinal body further comprises an opposed pair of transversal extended portions disposed on respective transversal sides of the elongated body.

15. The string-equipped apparatus of claim 14, wherein the transversal extended portions are sized and designed to space apart two adjacent vibration absorbers to prevent the masses of respective adjacent vibration absorbers to contact each other when a plurality of vibration absorbers is transversally secured, adjacent to each other, on the vibrating object.

16. The string-equipped apparatus of claim 9, wherein the vibrating object is securable in the elongated opening.

17. The string-equipped apparatus of claim 9, wherein a plurality of vibration absorbers is securable together to circumscribe the vibrating object by interconnecting protruding portions with an elongated opening.

18. The string-equipped apparatus of claim 9, wherein the elongated body includes an elongated opening including two parts secured together with a lock member.

\* \* \* \* \*